United States Patent
Teshirogi et al.

(10) Patent No.: US 7,812,760 B2
(45) Date of Patent: Oct. 12, 2010

(54) SHORT-RANGE RADAR AND CONTROL METHOD THEREOF

(75) Inventors: Tasuku Teshirogi, Tokyo (JP); Masanori Ejima, Kuki (JP)

(73) Assignees: Anritsu Corporation, Atsugi-Shi (JP); Matsushita Electric Industrial Co., Ltd., Kadoma-Shi (JP)

( * ) Notice: Subject to any disclaimer, the term of this patent is extended or adjusted under 35 U.S.C. 154(b) by 312 days.

(21) Appl. No.: 11/989,274

(22) PCT Filed: Mar. 2, 2007

(86) PCT No.: PCT/JP2007/054074

§ 371 (c)(1),
(2), (4) Date: Jan. 23, 2008

(87) PCT Pub. No.: WO2007/122873

PCT Pub. Date: Nov. 1, 2007

(65) Prior Publication Data

US 2009/0256740 A1    Oct. 15, 2009

(30) Foreign Application Priority Data

Apr. 20, 2006    (JP) .............................. 2006-116729

(51) Int. Cl.
*G01S 13/10*    (2006.01)
*G01S 7/28*    (2006.01)
*G01S 13/00*    (2006.01)

(52) U.S. Cl. ........................... 342/135; 342/21; 342/82; 342/89; 342/118; 342/134; 342/175; 342/202; 342/204

(58) Field of Classification Search ............ 342/21, 342/27, 28, 70–72, 82, 89, 90, 118, 134–145, 342/175, 188–197, 202–204, 361–366, 200, 342/201, 159–174; 375/130–153
See application file for complete search history.

(56) References Cited

U.S. PATENT DOCUMENTS 3,603,991 A * 9/1971 Bernstein et al. ............ 342/204

(Continued)

FOREIGN PATENT DOCUMENTS

| JP | 60-196018 A | 10/1985 |
| JP | 63-122981 A | 5/1988 |
| JP | 2003-4842 A | 1/2003 |
| WO | WO 2005/117256 A1 | 12/2005 |

OTHER PUBLICATIONS

International Preliminary Report on Patentability, Chapter I of the Patent Cooperation Treaty, and Written Opinion dated Nov. 27, 2008 for PCT/JP2007/054074. 7 sheets.

(Continued)

*Primary Examiner*—Bernarr E Gregory
(74) *Attorney, Agent, or Firm*—Holtz, Holtz, Goodman & Chick, PC

(57) ABSTRACT

A transmitting unit of a short-range radar includes a first pulse generating unit, a second pulse generating unit, an oscillator and a switch, and while complying with the spectrum mask specified for a UWB short-range radar, emits a predetermined short pulse wave not interfering with the RR prohibited band or the SRD band into the space. The first pulse generating unit outputs a first pulse having the width larger than the width of the short pulse wave in a predetermined period. The second pulse generating unit outputs a second pulse having the width corresponding to the width of the short pulse wave during the period when the first pulse generating unit outputs the first pulse. The oscillator oscillates only during the period when the first pulse generating unit outputs the first pulse, and the switch is turned on and passes the output signal from the oscillator only during the period when the second pulse generating unit outputs the second pulse, thereby to emit the output signal from the switch into the space as the predetermined short pulse wave.

22 Claims, 21 Drawing Sheets

U.S. PATENT DOCUMENTS

| | | | | |
|---|---|---|---|---|
| 3,688,214 | A * | 8/1972 | Goldie | 342/204 |
| 3,706,095 | A * | 12/1972 | Cherwek | 342/203 |
| 3,725,925 | A * | 4/1973 | Holmgren | 342/204 |
| 3,945,012 | A * | 3/1976 | Cooper | 342/201 |
| 4,123,755 | A * | 10/1978 | Fishbein et al. | 342/203 |
| 4,320,399 | A * | 3/1982 | Buck et al. | 342/204 |
| 4,450,444 | A * | 5/1984 | Wehner et al. | 342/196 |
| 5,361,070 | A * | 11/1994 | McEwan | 342/21 |
| 5,543,799 | A * | 8/1996 | Heger | 342/21 |
| 6,191,724 | B1 * | 2/2001 | McEwan | 342/21 |
| 6,414,627 | B1 * | 7/2002 | McEwan | 342/134 |
| 6,693,582 | B2 * | 2/2004 | Steinlechner et al. | 342/70 |
| 6,753,803 | B2 | 6/2004 | Szajnowski | |
| 7,161,526 | B2 * | 1/2007 | Cornic et al. | 342/27 |

OTHER PUBLICATIONS

FCC 04-285 "Second Report and Order and Second Memorandum Opinion and Order"; Dec. 16, 2004.

FCC 20-48 "First Report and Order"; Apr. 22, 2002.

T. Teshirogi et al; "Wideband Circularly Polarized Array Antenna With Sequential Rotation and Phase Shift of Elements"; ISAP 85, 024-3, pp. 117-120, 1985.

T. Teshirogi et al; "UWB Automotive Radar to Mitigate Impact on Radio Services Using Restricted Band"; 2005 IEEE; pages.

* cited by examiner

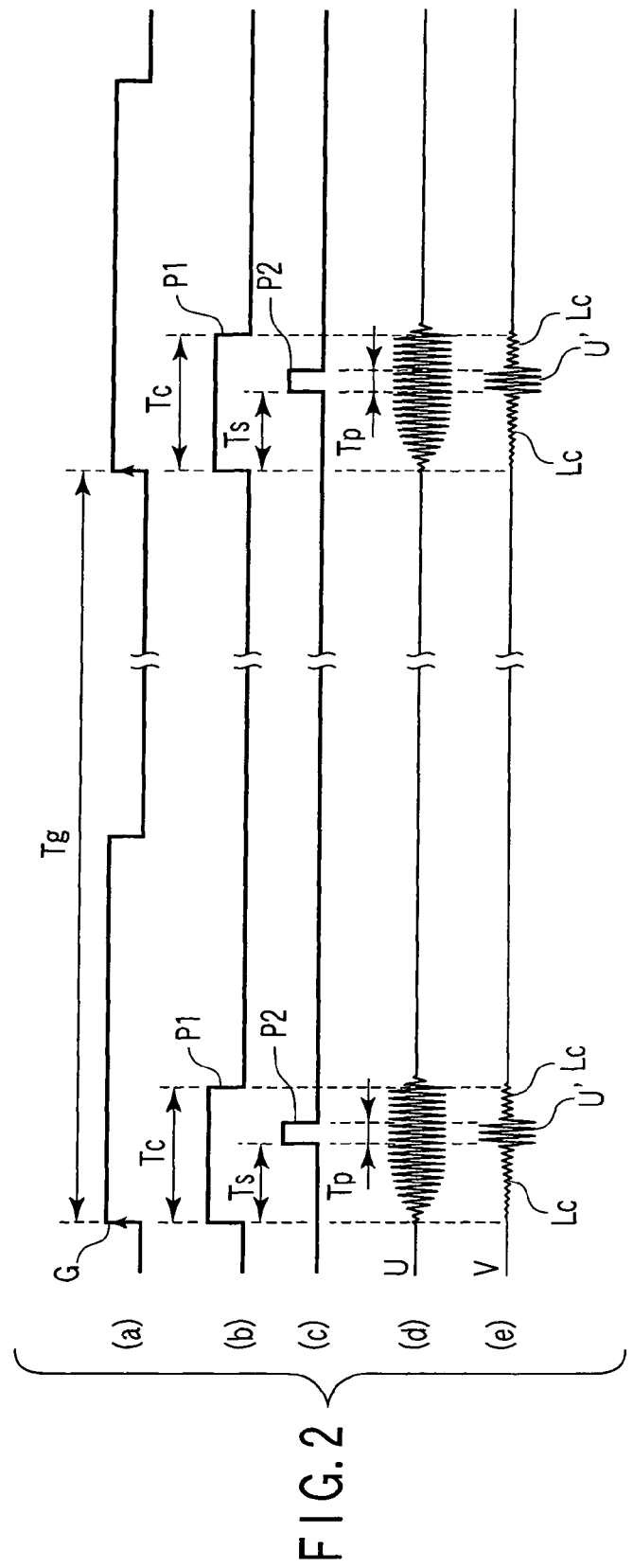

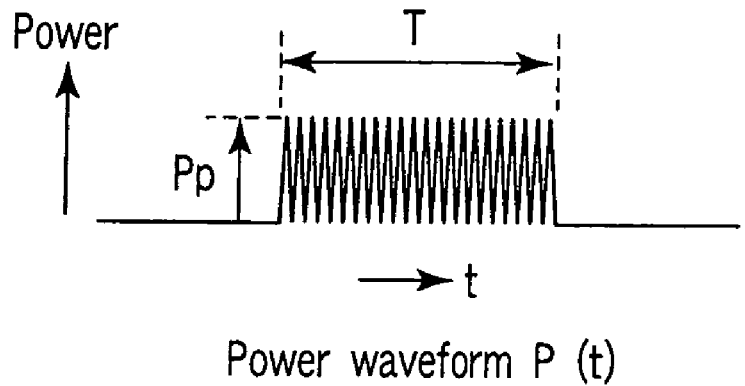
Power waveform P (t)
F I G. 5A
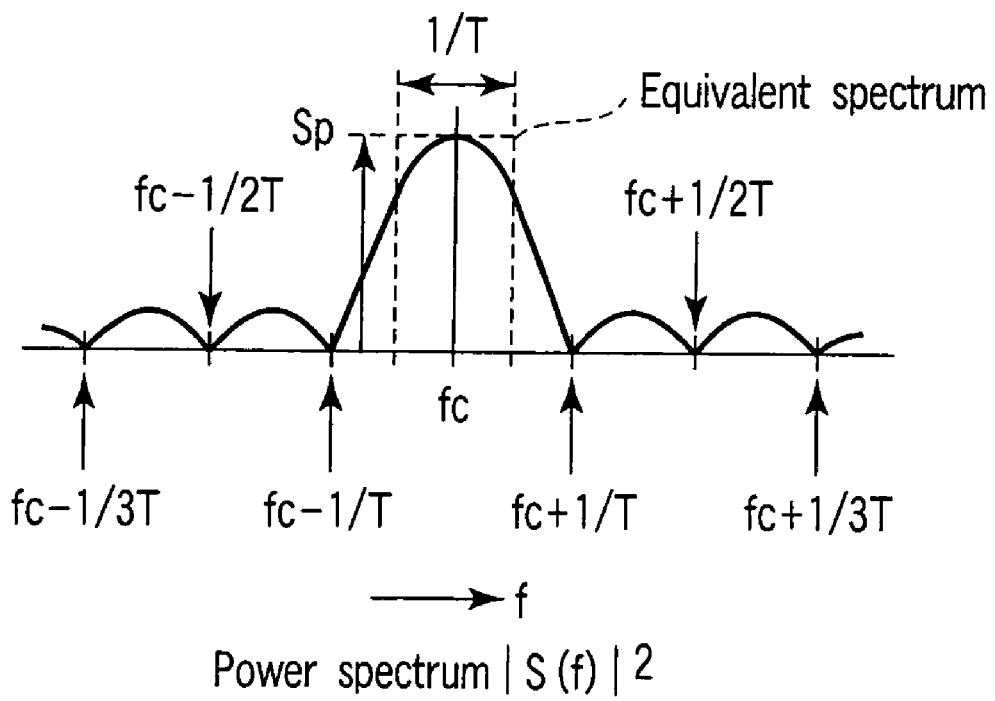
Power spectrum $|S(f)|^2$
F I G. 5B Power waveform of signal V (short pulse wave)

Power spectrum $|S(f)|^2$

| Tc | I = 20dB | | I = 30dB | |
|---|---|---|---|---|
| | Sc/Sp | ΔS | Sc/Sp | ΔS |
| 10ns | 1 | 3dB | 0.1 | 0.4dB |
| 50ns | 25 | 14dB | 2.5 | 5.4dB |
| 100ns | 100 | 20dB | 10 | 10.4dB |
F I G. 7
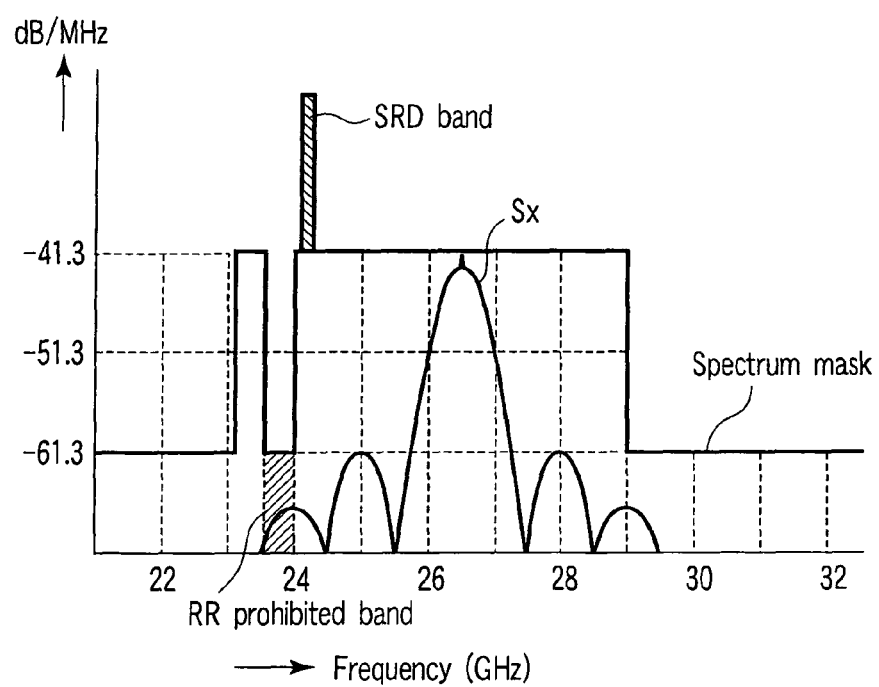
F I G. 8

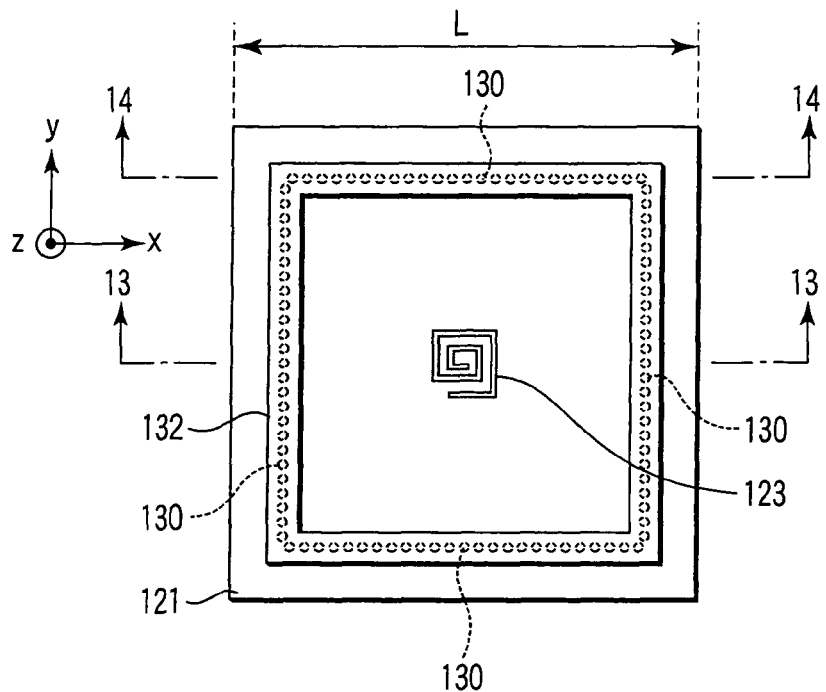
F I G. 11
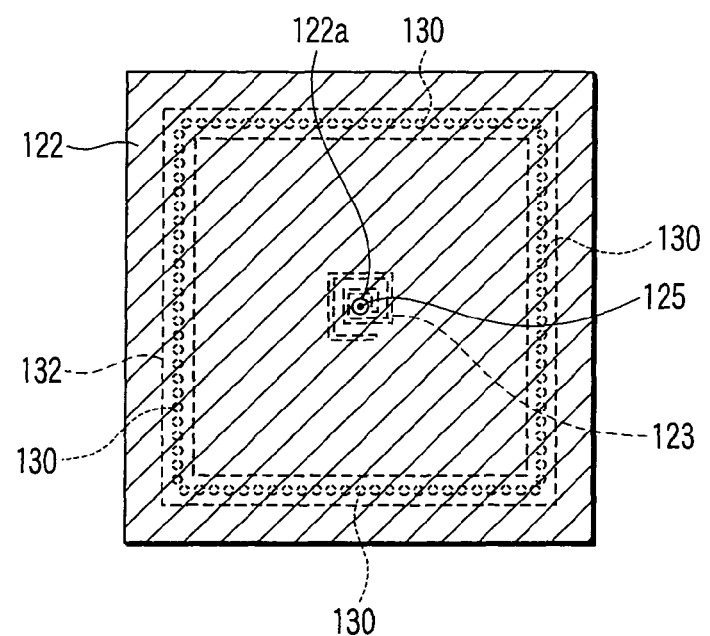
F I G. 12

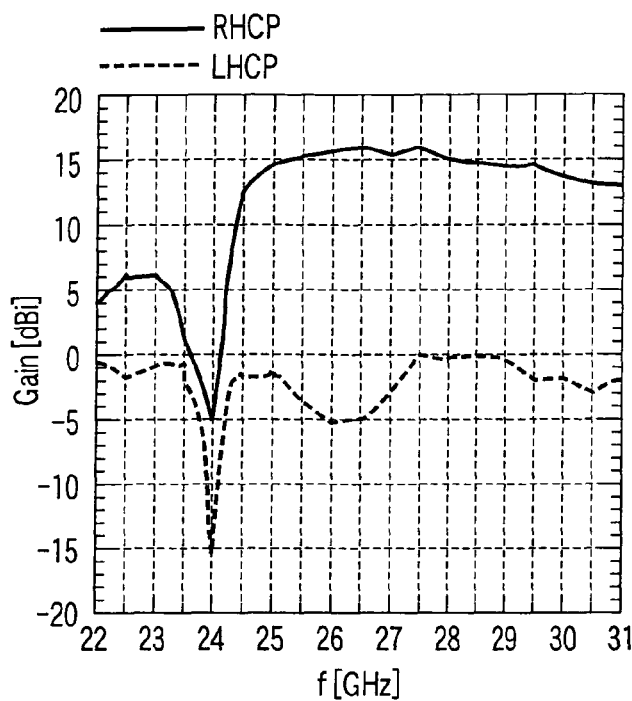
F I G. 16
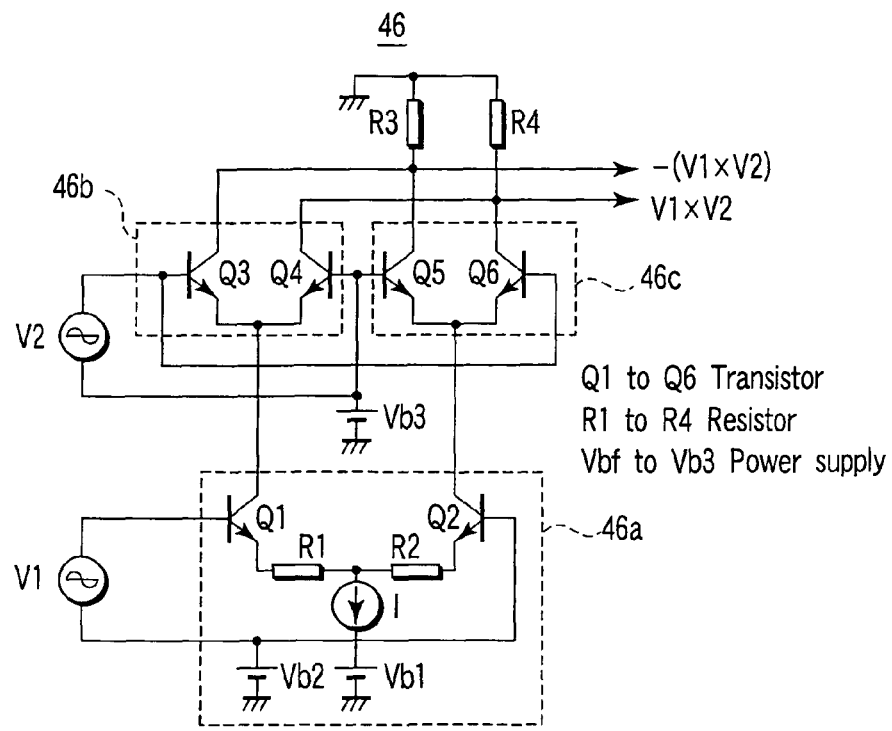
F I G. 17

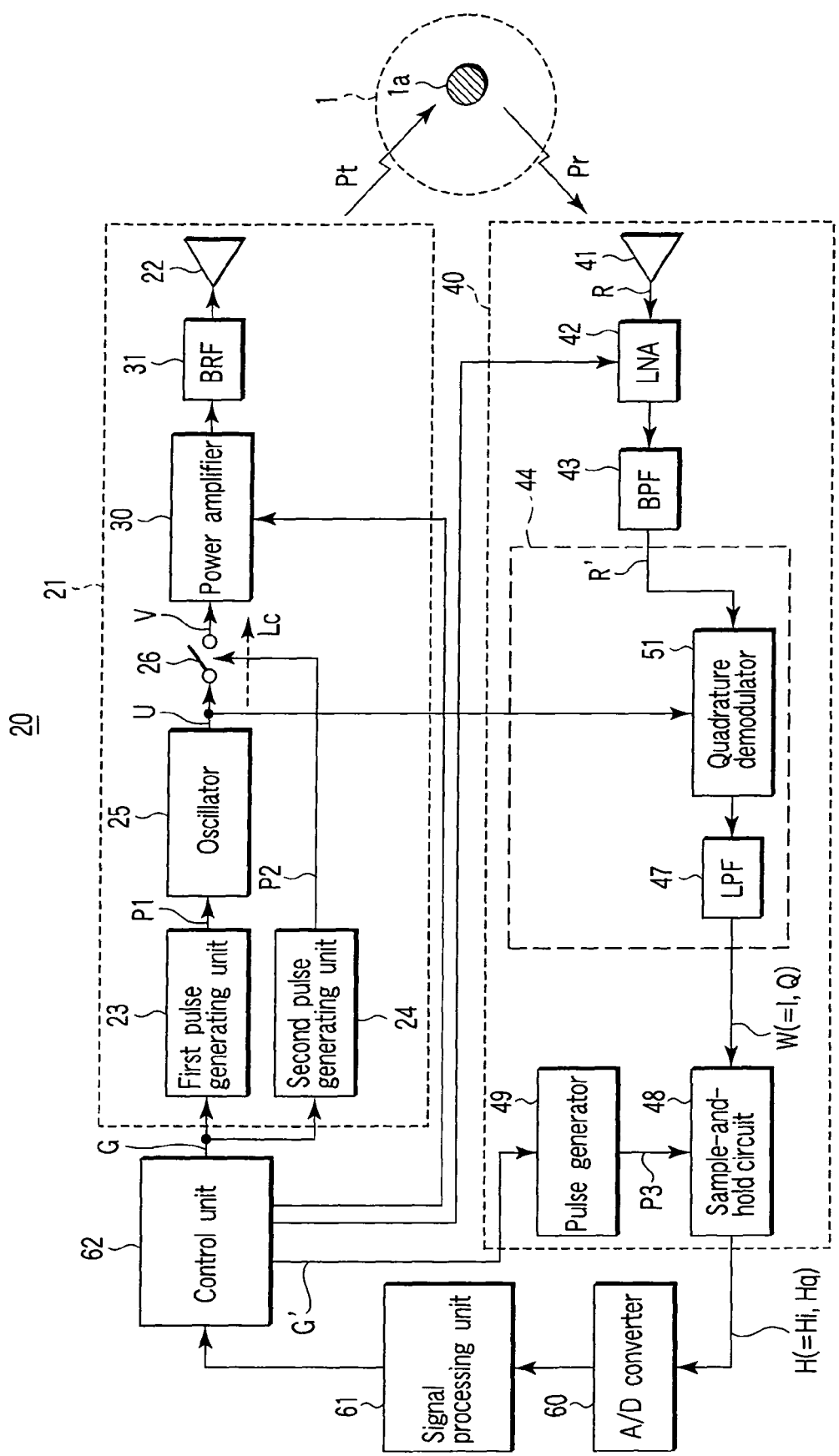
F I G. 20A

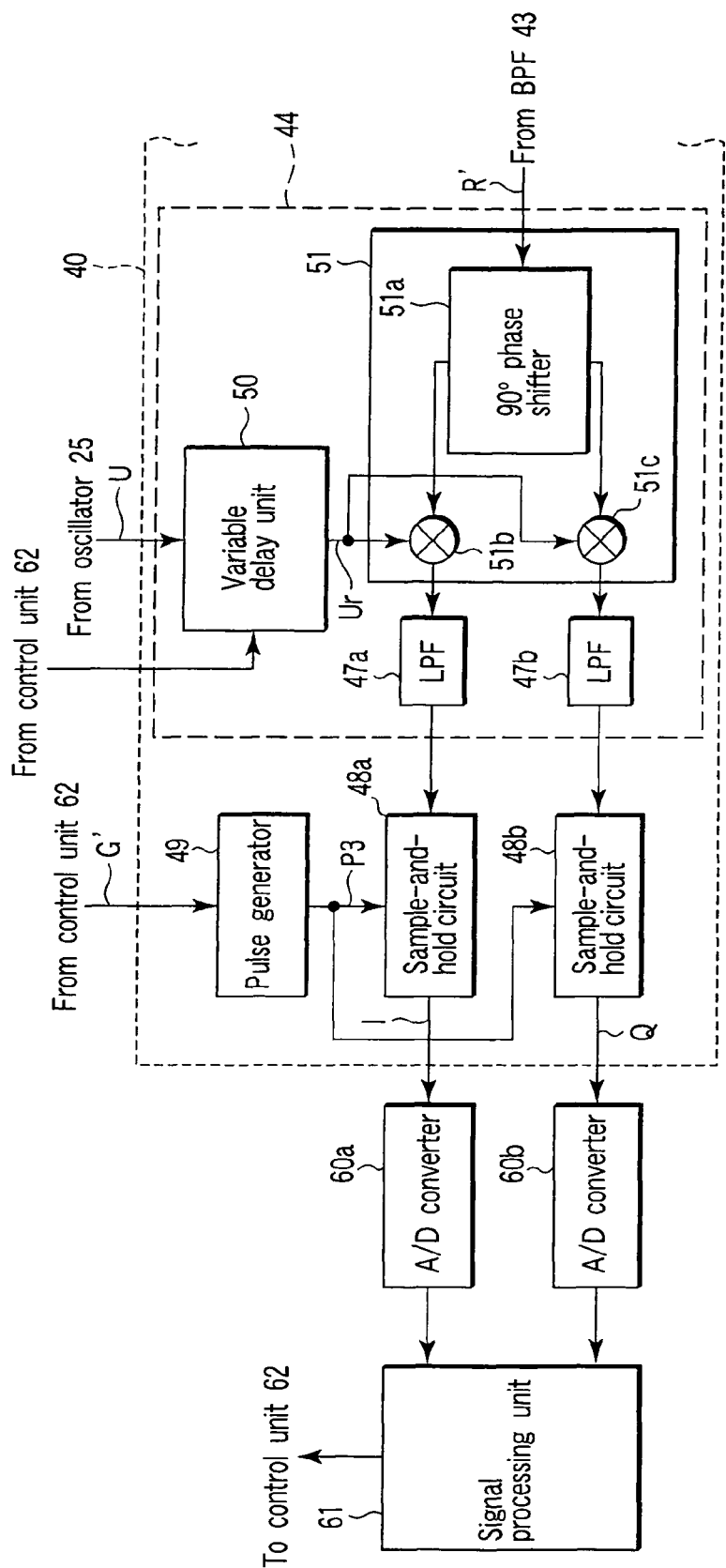
F I G. 20C

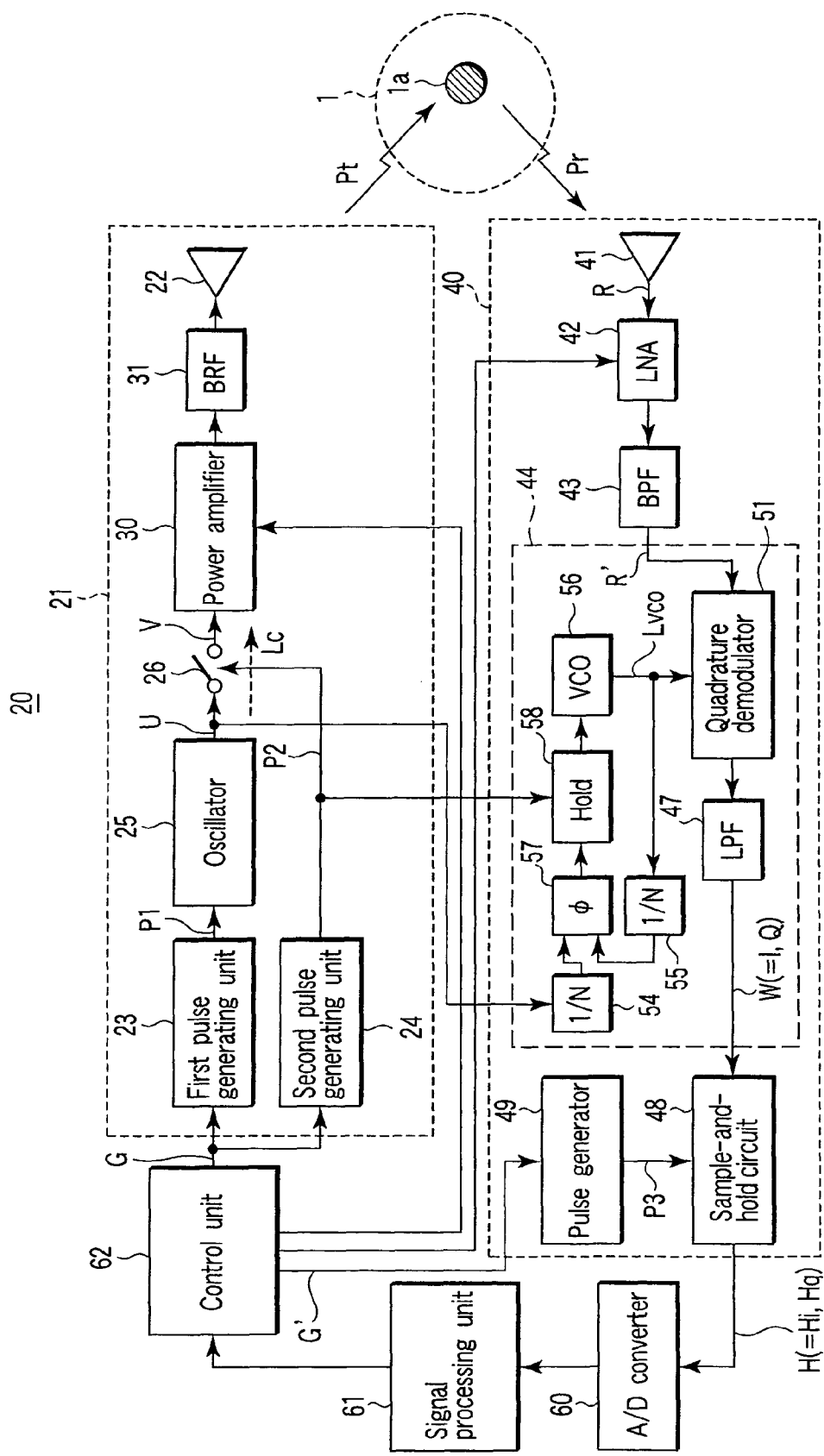
F I G. 22

SHORT-RANGE RADAR AND CONTROL METHOD THEREOF

CROSS-REFERENCE TO RELATED APPLICATIONS

This application is a U.S. National Phase Application under 35 USC 371 of International Application PCT/JP2007/054074 filed Mar. 2, 2007.

TECHNICAL FIELD

The present invention relates to a short-range radar and a control method thereof, and particularly to a short-range radar using UWB (Ultra Wideband) of 22 to 29 GHz employing a technique exactly complying with the stipulation of the International Radio Communication Regulations (RR) and a control method thereof.

BACKGROUND OF THE INVENTION

Recently, a short-range radar using UWB has nearly come to find practical application for use on an automotive vehicle and for visually handicapped persons.

In the short-range radar of this type using UWB, like in the ordinary radar, the short pulse wave is emitted from the antenna of a transmitting unit into the space, and a receiving unit receives the wave reflected from an object existing in the space thereby to analyze the object.

FIG. 24 is a block diagram showing the general configuration of the transmitting unit of the conventional short-range radar of this type.

Specifically, in the transmitting unit of this short-range radar, a carrier signal S of a predetermined UWB frequency output continuously from a carrier signal generator 1 is input to a switch circuit 2.

The switch circuit 2 is intermittently turned on/off by a pulse signal Pa output from a pulse generator 3 in a predetermined period thereby to generate a short pulse wave (burst carrier) Pb.

This short pulse wave (burst carrier) Pb, after being amplified by an amplifier 4, is emitted into the space from an antenna 5.

The aforementioned configuration in which the short pulse wave Pb is generated by intermittently turning on/off the switch circuit 2 inserted into the path of the carrier signal S, however, poses the problem that the carrier signal output, though ideally completely stopped during the turn-off state of the switch circuit 2, cannot be actually stopped completely due to the leak of the switch circuit 2.

The turn-off period (for example, 1 μs) of the switch circuit 2 is normally very long as compared with the turn-on period (for example, 1 ns) thereof. On the average, therefore, the power of the carrier leak is not ignorable.

Especially, it is difficult to prevent the leak of the carrier signal in the UWB of high frequency.

Therefore, the spectrum density Sx of the short pulse wave Pb, as shown in FIG. 25, for example, is such that the leak component S' is projected considerably at the position of the carrier frequency fc.

This leak component S' limits the real receiving sensitivity of the reflected wave of the short pulse wave Pb output at the regular transmission timing. As a result, the radar search range is narrowed, and it becomes difficult to detect an obstacle of a low reflectivity as an object existing in the space.

With regard to the UWB radar system described above, FCC (Federal Communication Commission of USA) provides, in Non-Patent Document 1 described below, the spectrum mask as shown in FIG. 26.

This spectrum mask, revised and published on Dec. 16, 2004, constitutes a standard much stricter than the first one disclosed on Feb. 14, 2002 in Non-Patent Document 2 described below.

In this revised spectrum mask, the power density of UWB in the range of 22.0 to 23.12 GHz and the range not lower than 29.0 GHz is specified at −61.3 dBm/MHz or less on the one hand, and the power density in the range of 23.12 to 23.6 GHz and the range of 24.0 to 29.0 GHz is specified at −41.3 dBm/MHz or less.

Also, in the frequency range of 23.6 to 24.0 GHz or what is called the radiowave emission prohibited band (RR prohibited band) or the radiowave emission restricted band (RR restricted band) where the radiowave emission is intentionally prohibited under the International Radio Communication Regulations (RR) to protect the passive sensor of the radio astronomy or the Earth Exploration Satellite Service (EESS), the emission power density is suppressed to −61.3 dBm/MHz lower by 20 dB than in the past.

In the spectrum mask described above, the total energy amount in each predetermined band is restricted to not more than a specified value. In the case where the leak component S' is large as in the aforementioned case, therefore, the output of the short pulse wave Pb for the regular transmission timing is required to be set at a correspondingly low level, resulting in a considerable limitation of the search range of the radar.

In view of this, a solution to the problem of the leak component S' has been conceived, in which as shown in FIG. 26, the carrier frequency of the short pulse wave Pb is made to coincide with the UWB frequency band of 24.05 to 24.25 GHz for the Doppler radar (Short Range Device: SRD) where the emission of the power of a higher level than −41.3 dBm/MHz is permitted.

In the neighborhood of this SRD band, however, the aforementioned RR prohibited band exists. Further, as described above, the short pulse wave Pb constituting the pulse modulation signal as a carrier signal turned on/off intermittently by the pulse signal has a spectrum width of several hundred MHz to 2 GHz.

In the case where the carrier frequency is set at the SRD band in the neighborhood of the RR prohibited band as described above, therefore, the considerably high level portion of the spectrum of the short pulse wave Pb is superposed with the RR prohibited band. Actually, therefore, it is very difficult to suppress the emission power density to −61.3 dBm or less specified by the latest spectrum mask.

Also, the first FCC standard permitting the emission level in the RR prohibited band up to −41.3 dBm/MHz stipulates that in order not to interfere with the EESS described above, the emission strength of the radiowave used for other purposes at the angle of emission direction (direction of elevation) larger than 30° from the normal to the globe surface is required to be lower than the emission strength in the emission range of 0° to 30° by −25 dB or more (in and after January, 2005). This standard has since become increasingly stricter for each several years.

In the case where the carrier frequency is set in the SRD band as described above, therefore, the side lobe of the vertical surface of the antenna is required to be suppressed so as not to increase the direction of emission of transmitted radiowave.

The suppression of the side lobe on the vertical surface of the antenna, however, requires the arrangement of a number of antenna elements along the height into an array. This increases the size along the height and makes an application as an on-vehicle radar difficult.

Also, in order to avoid the problem of the leak component S', various methods have been conceived to improve the isolation of the switch circuit 2.

Even in the case where a switch capable of achieving a high isolation in the very high frequency band described above can be realized, however, such a switch is very expensive and very difficult to employ for the on-vehicle radar used by common people or visually handicapped persons.

Non-Patent Document 1: FCC 04-285 "SECOND REPORT AND ORDER AND SECOND MEMORANDUM OPINION AND ORDER"

Non-Patent Document 2: FCC 02-48, "FIRST REPORT AND ORDER"

BRIEF SUMMARY OF THE INVENTION

The present invention has been achieved in view of the situation described above, and an object thereof is to provide a short-range radar having an inexpensive configuration and a control method thereof in which the interference with the RR prohibited band and the SRD band is prevented while at the same time complying with the stipulated spectrum mask.

According to a first aspect of the present invention, in order to achieve the above object, there is provided a short-range radar comprising:

a transmitting unit (21) which emits a predetermined short pulse wave (Pt) into a space (1) from a transmission antenna (22);

a receiving unit (40) which executes a process of receiving a wave reflected (Pr) from an object (1a) existing in the space (1); and a signal processing unit (61) which executes a process of analyzing the object (1a) based on an output signal from the receiving unit (40), wherein the transmitting unit (21) includes:

a first pulse generating unit (23) which outputs a first pulse (P1) having a width (Tc) longer than a width of the short pulse wave (Pt) in a predetermined period (Tg);

a second pulse generating unit (24) which outputs a second pulse (P2) having a width corresponding to the width of the short pulse wave (Pt) at a timing upon lapse of a predetermined time (Ts) during an output period from the time point when the first pulse generating unit (23) starts to output the first pulse (P1);

an oscillator (25) which oscillates only during the period when the first pulse generating unit (23) outputs the first pulse (P1) and outputs a signal in a frequency band of the short pulse wave (Pt); and a switch (26) which receives an output signal (U) from the oscillator (25), and is turned on to pass the output signal (U) from the oscillator (25) only during the period when the second pulse (P2) is output by the second pulse generating unit (24), an output signal (V) from the switch (26) being emitted into the space (1) as the predetermined short pulse wave (Pt).

According to a second aspect of the present invention, in order to achieve the above object, there is provided the short-range radar according to the first aspect, wherein a width Tc of the first pulse (P1), a width Tp of the second pulse (P2) and isolation I of the switch (26) are set to satisfy the following relation:

$(Tc/Tp)^2 \leq I$

According to a third aspect of the present invention, in order to achieve the above object, there is provided the short-range radar according to the first aspect, wherein an oscillation frequency of the oscillator (25) and the width Tp of the second pulse (P2) are set in such a manner that substantially a whole main lobe of the spectrum of the short pulse wave (Pt) emitted into the space (1) is included in the range of 24.0 to 29.0 GHz.

According to a fourth aspect of the present invention, in order to achieve the above object, there is provided the short-range radar according to the third aspect, wherein the transmission antenna (22) of the transmitting unit (21) has a structure surrounding an antenna element (123) with a cavity (130), and a resonance frequency of the cavity (130) is set in the band of 23.6 to 24.0 GHz thereby to reduce a gain of the particular band.

According to a fifth aspect of the present invention, in order to achieve the above object, there is provided the short-range radar according to the first aspect, wherein the receiving unit (40) includes:

a receiving antenna (41) which receives the wave reflected (Pr) from the object (1a) existing in the space (1);

a detection circuit (44) which detects a receiving signal (R') of the reflected wave (Pr) received by the receiving antenna (41); and a sample-and-hold circuit (48) which integrates the signal (W=I, Q) detected by the detection circuit (44) and holds the integration result, and the detection circuit (44) includes:

a diverging circuit (45) which divides the receiving signal (R') of the reflected wave (Pr) received by the receiving antenna (41) into a pair of signals of the same phase and outputs the pair of signals (V1, V2);

a linear multiplier (46) which linearly multiplies the pair of signals (V1, V2) from the diverging circuit (45); and a lowpass filter (47) which extracts a baseband component (I, Q) from the output signal linearly multiplied by the linear multiplier (46).

According to a sixth aspect of the present invention, in order to achieve the above object, there is provided the short-range radar according to the first aspect, wherein the receiving unit (40) includes:

a receiving antenna (41) which receives the wave reflected (Pr) from the object (1a) existing in the space (1);

a detection circuit (44) which detects a receiving signal (R') of the reflected wave (Pr) received by the receiving antenna (41); and a sample-and-hold circuit (48) which integrates the signal (W=I, Q) detected by the detection circuit (44) and holds the integration result, and the detection circuit (44) includes:

a quadrature demodulator (51) which quadrature-detects the receiving signal (R') with the output signal (U) from the oscillator (25) as a local signal; and a lowpass filter (47) which extracts a baseband component (I, Q) from the output signal quadrature-detected by the quadrature demodulator (51).

According to a seventh aspect of the present invention, in order to achieve the above object, there is provided the short-range radar according to the first aspect, wherein the receiving unit (40) includes:

a receiving antenna (41) which receives the wave reflected (Pr) from the object (1a) existing in the space (1);

a detection circuit (44) which detects a receiving signal (R') of the reflected wave (Pr) received by the receiving antenna (41); and a sample-and-hold circuit (48) which integrates the signal (W=I, Q) detected by the detection circuit (44) and holds the integration result, and the detection circuit (44) includes:

a variable delay unit (50) which delays the output signal (U) from the oscillator (25);

a quadrature demodulator (51) which quadrature-detects the receiving signal (R') with the output signal (Ur) from the variable delay unit (50) as a local signal; and a lowpass filter (47) which extracts a baseband component (I, Q) from the output signal quadrature-detected by the quadrature demodulator (51).

According to an eighth aspect of the present invention, in order to achieve the above object, there is provided the short-range radar according to the first aspect, wherein the receiving unit (40) includes:

a receiving antenna (41) which receives the wave reflected (Pr) from the object (1a) existing in the space (1);

a detection circuit (44) which detects a receiving signal (R') of the reflected wave (Pr) received by the receiving antenna (41); and a sample-and-hold circuit (48) which integrates the signal (W=I, Q) detected by the detection circuit (44) and holds the integration result, and the detection circuit (44) includes:

a phase-locked loop circuit (54, 55, 56, 57, 58) having a voltage-controlled oscillator (56) which receives the output signal from the oscillator (25) as a reference signal and outputs a signal (Vvco) synchronized in frequency with the reference signal during the period when the frequency of the reference signal is stable, and upon lapse of the period when the frequency of the reference signal is stable, holding the voltage-controlled oscillator (56) in a state immediately before the end of the period when the frequency of the reference signal is stable;

a quadrature demodulator (51) which quadrature-detects the receiving signal (R') with the output signal (Vvco) of the voltage-controlled oscillator (56) of the phase-locked loop circuit (54, 55, 56, 57, 58) as a local signal; and a lowpass filter (47) which extracts a baseband component (I, Q) from the output signal quadrature-detected by the quadrature demodulator (51).

According to a ninth aspect of the present invention, in order to achieve the above object, there is provided the short-range radar according to the fifth aspect, wherein the linear multiplier (46) includes:

a first differential amplifier (46a) to which a first signal (V1) of the pair of signals (V1, V2) is input differentially;

second and third differential amplifiers (46b, 46c) which are connected to a load side of the first differential amplifier (46a) and to which a second signal (V2) of the pair of signals (V1, V2) is input differentially; and a Gilbert mixer connected to load sides of the second and third differential amplifiers (46b, 46c) and including a monolithic microwave integrated circuit having first and second load resistors (R3, R4) which output only a signal component (V1×V2) equal to the product of the first signal (V1) and the second signal (V2) or −(V1×V2).

According to a tenth aspect of the present invention, in order to achieve the above object, there is provided the short-range radar according to the first aspect, further comprising an analog/digital converter (60) which converts the output signal (H) from the receiving unit (40) into a digital signal and inputs the digital signal to the signal processing unit (61).

According to an eleventh aspect of the present invention, in order to achieve the above object, there is provided the short-range radar according to the first aspect, further comprising a control unit (62) which controls at least one of the transmitting unit (21) and the receiving unit (40) in accordance with a predetermined schedule or a processing result from the signal processing unit (61).

According to a twelfth aspect of the present invention, in order to achieve the above object, there is provided a method of controlling a short-range radar, comprising:

a step of preparing a transmitting unit (21) having a transmission antenna (22), a receiving unit (40) and a signal processing unit (61);

a step of emitting a predetermined short pulse wave (Pt) into a space (1) from the transmission antenna (22) using the transmitting unit (21);

a step of executing a process of receiving a reflected wave (Pr) from an object (1a) existing in the space (1) using the receiving unit (40); and a step of executing a process of analyzing the object (1a) based on an output signal from the receiving unit (40) using the signal processing unit (61), wherein the step of emitting the predetermined short pulse wave (Pt) into the space (1) includes:

a step of preparing a first pulse generating unit (23), a second pulse generating unit (24), an oscillator (25) and a switch (26);

a step of outputting a first pulse (P1) having a width (Tc) longer than a width of the short pulse wave (Pt) in a predetermined period (Tg) using the first pulse generating unit (23);

a step of outputting, using the second pulse generating unit (24), a second pulse (P2) having a width corresponding to the width of the short pulse wave (Pt) at a timing upon lapse of a predetermined time (Tc) from the time point when the first pulse generating unit (23) starts to output the first pulse (P1) and during the period when the first pulse generating unit (23) outputs the first pulse (P1);

a step of causing the oscillator (25) to be oscillated and outputting a signal in a frequency band of the short pulse wave (Pt) only during the period when the first pulse generating unit (23) outputs the first pulse (P1);

a step of turning on the switch (26) thereby to receive and pass the output signal (U) from the oscillator (25) only during the period when and the second pulse generating unit (24) outputs the second pulse (P2); and a step of emitting the output signal (V) from the switch (26) as the predetermined short pulse wave (Pt) into the space (1).

According to a thirteenth aspect of the present invention, in order to achieve the above object, there is provided the method of controlling a short-range radar according to the twelfth aspect, wherein a width Tc of the first pulse (P1), a width Tp of the second pulse (P2) and isolation I of the switch (26) are set to satisfy the following relation:

$$(Tc/Tp)^2 \leq I$$

According to a fourteenth aspect of the present invention, in order to achieve the above object, there is provided the method of controlling a short-range radar according to the twelfth aspect, wherein an oscillation frequency of the oscillator (25) and the width Tp of the second pulse (P2) are set in such a manner that substantially a whole main lobe of the spectrum of the short pulse wave (Pt) emitted into the space (1) is included in the range of 24.0 to 29.0 GHz.

According to a fifteenth aspect of the present invention, in order to achieve the above object, there is provided the method of controlling a short-range radar according to the fourteenth aspect, wherein the transmission antenna (22) has a structure surrounding an antenna element (123) with a cavity (130), and a resonance frequency of the cavity (130) is set in the band of 23.6 to 24.0 GHz thereby to reduce a gain of the particular band.

According to a sixteenth aspect of the present invention, in order to achieve the above object, there is provided the method of controlling a short-range radar according to the twelfth aspect, wherein the step of executing the process of receiving the reflected wave (Pr) includes:

a step of preparing a receiving antenna (41), a detection circuit (44) and a sample-and-hold circuit (48);

a step of receiving the wave reflected (Pr) from the object (1a) existing in the space (1) using the receiving antenna (41);

a step of detecting the receiving signal (R') of the reflected wave (Pr) received by the receiving antenna (41) using the detection circuit (44); and a step of integrating, using the sample-and-hold circuit (48), the signal (W) detected by the detection circuit (44) and holding the integration result, and the step of detecting the receiving signal (R') includes:

a step of preparing a diverging circuit (45), a linear multiplier (46) and a lowpass filter (47);

a step of diverging the receiving signal (R') of the reflected wave (Pr) received by the receiving antenna (41) into a pair of signals in the same phase using the diverging circuit (45) and outputting the pair of signals (V1, V2);

a step of linearly multiplying the pair of signals (V1, V2) from the diverging circuit (45) using the linear multiplier (46); and a step of extracting, using the lowpass filter (47), a baseband component from the output signal linearly multiplied by the linear multiplier (46).

According to a seventeenth aspect of the present invention, in order to achieve the above object, there is provided the method of controlling a short-range radar according to the twelfth aspect, wherein the step of executing the process of receiving the reflected wave (Pr) includes:

a step of preparing a receiving antenna (41), a detection circuit (44) and a sample-and-hold circuit (48);

a step of receiving the wave reflected (Pr) from the object (1a) existing in the space (1) using the receiving antenna (41);

a step of detecting, using the detection circuit (44), the receiving signal (R') of the reflected wave (Pr) received by the receiving antenna (41); and a step of integrating, using the sample-and-hold circuit (48), the signal (W) detected by the detection circuit (44) and holding the integration result, and the step of detecting the receiving signal (R') includes:

a step of preparing a quadrature demodulator (51) and a lowpass filter (47);

a step of quadrature-detecting the receiving signal (R') using the quadrature demodulator (51) with the output signal (U) from the oscillator (25) as a local signal; and a step of extracting, using the lowpass filter (47), a baseband component from the output signal quadrature-detected by the quadrature demodulator (51).

According to an eighteenth aspect of the present invention, in order to achieve the above object, there is provided the method of controlling a short-range radar according to the twelfth aspect, wherein the step of executing the process of receiving the reflected wave (Pr) includes:

a step of preparing a receiving antenna (41), a detection circuit (44) and a sample-and-hold circuit (48);

a step of receiving the wave reflected (Pr) from the object (1a) existing in the space (1) using the receiving antenna (41);

a step of detecting, using the detection circuit (44), the receiving signal (R') of the reflected wave (Pr) received by the receiving antenna (41); and a step of integrating, using the sample-and-hold circuit (48), the signal (W) detected by the detection circuit (44) and holding the integration result, and the step of detecting the receiving signal (R') includes:

a step of preparing a variable delay unit (50), a quadrature demodulator (51) and a lowpass filter (47);

a step of delaying the output signal (U) from the oscillator (25) using the variable delay unit (50);

a step of quadrature-detecting the receiving signal (R') using the quadrature demodulator (51) with the output signal (Ur) from the variable delay unit (50) as a local signal; and a step of extracting, using the lowpass filter (47), a baseband component from the output signal quadrature-detected by the quadrature demodulator (51).

According to a nineteenth aspect of the present invention, in order to achieve the above object, there is provided the method of controlling a short-range radar according to the twelfth aspect, wherein the step of executing the process of receiving the reflected wave (Pr) includes:

a step of preparing a receiving antenna (41), a detection circuit (44) and a sample-and-hold circuit (48);

a step of receiving the wave reflected (Pr) from the object (1a) existing in the space (1) using the receiving antenna (41);

a step of detecting, using the detection circuit (44), the receiving signal (R') of the reflected wave (Pr) received by the receiving antenna (41); and a step of integrating, using the sample-and-hold circuit (48), the signal (W) detected by the detection circuit (44) and holding the integration result, and the step of detecting the receiving signal (R') includes:

a step of preparing a phase-locked loop circuit (54, 55, 56, 57, 58) including a voltage-controlled oscillator (56), a quadrature demodulator (51) and a lowpass filter (47);

a step of receiving, using the voltage-controlled oscillator (56), the output signal (U) from the oscillator (25) as a reference signal and outputting a signal (Lvco) synchronized in frequency with the reference signal during the period when the frequency of the reference signal is stable;

a step of holding, using the phase-locked loop circuit (54, 55, 56, 57, 58), the voltage-controlled oscillator (56) in a state immediately before the end of the period when the frequency of the reference signal is stable, after the lapse of the period when the frequency of the reference signal is stable;

a step of quadrature-detecting, using the quadrature demodulator (51), the receiving signal (R') of the reflected wave (Pr) received by the receiving antenna (41) with the output signal (Lvco) of the voltage-controlled oscillator (56) of the phase-locked loop circuit (54, 55, 56, 57, 58) as a local signal; and a step of extracting, using the lowpass filter (47), a baseband component (I, Q) from the output signal quadrature-detected by the quadrature demodulator (51).

According to a twentieth aspect of the present invention, in order to achieve the above object, there is provided the method of controlling a short-range radar according to the sixteenth aspect, wherein the step of linearly multiplying the pair of signals (V1, V2) from the diverging circuit (45) using the linear multiplier (46) includes:

a step of preparing a Gilbert mixer configured of a monolithic microwave integrated circuit including a first differential amplifier (46a), second and third differential amplifiers (46b, 46c), and first and second load resistors (R3, R4);

a step of differentially inputting a first signal (V1) of the pair of signals (V1, V2) using the first differential amplifier (46a);

a step of differentially inputting a second signal (V2) of the pair of signals (V1, V2) using the second and third differential amplifiers (46*b*, 46*c*) connected to a load side of the first differential amplifier (46*a*); and a step of outputting only a signal component (V1×V2) equal to the product of the first signal (V1) and the second signal (V2) or −(V1×V2) using the first and second load resistors (R3, R4) connected to load sides of the second and third differential amplifiers (46*b*, 46*c*).

According to a twenty-first aspect of the present invention, in order to achieve the above object, there is provided the method of controlling a short-range radar according to the twelfth aspect, further comprising:

a step of preparing an analog/digital converter (60); and a step of converting the output signal (H) from the receiving unit (40) into a digital signal using the analog/digital converter (60) and inputting the digital signal to the signal processing unit (61).

According to a twenty-second aspect of the present invention, in order to achieve the above object, there is provided the method of controlling a short-range radar according to the twelfth aspect, further comprising:

a step of preparing a control unit (62); and a step of controlling at least one of the transmitting unit (21) and the receiving unit (40) in accordance with a predetermined schedule or a processing result from the signal processing unit (61) using the control unit (62).

As described above, the transmitting unit of the short-range radar according to the invention is adapted to output the short pulse wave by closing the switch for a short time in response to the second pulse in a stable state upon the lapse of a predetermined time after the oscillation is started by the first pulse.

As a result, the leak from the switch with the first pulse not output can be reduced to zero. As long as the output period of the first pulse is sufficiently short as compared with the period of the short pulse wave, therefore, the average leak amount can be reduced even by use of an inexpensive switch not very high in isolation. Thus, the emission power density of the short-range radar as a whole can be suppressed within the specified range of the spectrum mask.

Also, in the case of the short-range radar set to satisfy the relation $(Tc/Tp)^2 \leq I$ between a width Tc of the first pulse, a width Tp of the second pulse and switch isolation I, the average leak amount can be suppressed to not more than the power of the short pulse wave output in synchronism with the second pulse.

In the case of the short-range radar with the oscillation frequency of the oscillator and the width of the second pulse set in such a manner that substantially the whole main lobe of the spectrum of the short pulse wave emitted into the space is included in the range of 24.0 to 29.0 GHz, the emission of radiowave to the RR prohibited band and the SRD band can prevented more positively.

Also, the transmission antenna may be structured to surround the antenna elements with a cavity and have the resonance frequency of the cavity in the range of 23.6 to 24.0 GHz. By thus reducing the gain in this band, a short-range radar for UWB and a control method thereof can be realized which can prevent the radiowave emission to the RR prohibited band and the SRD band more positively.

BRIEF DESCRIPTION OF DRAWINGS

FIG. 2 is a timing chart for explaining the operation of essential parts of the short-range radar and the control method thereof according to the first embodiment of the invention.

FIG. 5A is a diagram showing the power waveform of the pulse modulation wave for explaining the operation of the essential parts of the short-range radar and the control method thereof according to the first embodiment of the invention.

FIG. 5B is a diagram showing the power spectrum of the pulse modulation wave for explaining the operation of the essential parts of the short-range radar and the control method thereof according to the first embodiment of the invention.

FIG. 7 is a graph showing the relation among the switch isolation, the time width of the first pulse and the increment of the carrier leak for explaining the operation of the essential-parts of the short-range radar and the control method thereof according to the first embodiment of the invention.

FIG. 8 is a diagram showing the relation between the spectrum of the short pulse wave and the specified spectrum mask applicable to UWB for explaining the operation of the essential parts of the short-range radar and the control method thereof according to the first embodiment of the invention.

FIG. 11 is a front view of the transmission antenna for explaining the configuration of the essential parts of the short-range radar and the control method thereof according to the first embodiment of the invention.

FIG. 12 is a rear view of the transmission antenna for explaining the configuration of the essential parts of the short-range radar and the control method thereof according to the first embodiment of the invention.

FIG. 16 is a characteristic diagram with a gain reduction area, if any, due to the resonance of the cavity formed on the transmission antenna for explaining the configuration of the essential parts of the short-range radar and the control method thereof according to the first embodiment of the invention.

FIG. 17 is a circuit diagram for explaining the configuration of the essential parts of the short-range radar and the control method thereof according to the first embodiment of the invention.

FIG. 20A is a block diagram showing the general configuration of a short-range radar and a control method thereof according to a second embodiment of the invention.

FIG. 20C is a block diagram showing the configuration of essential parts of a short-range radar and a control method thereof according to the third embodiment of the invention.

FIG. 22 is a block diagram showing the general configuration of a short-range radar and a control method thereof according to a fourth embodiment of the invention.

DETAILED DESCRIPTION OF THE INVENTION

Embodiments of the present invention will be explained below with reference to the drawings.

First Embodiment

Figure 1:
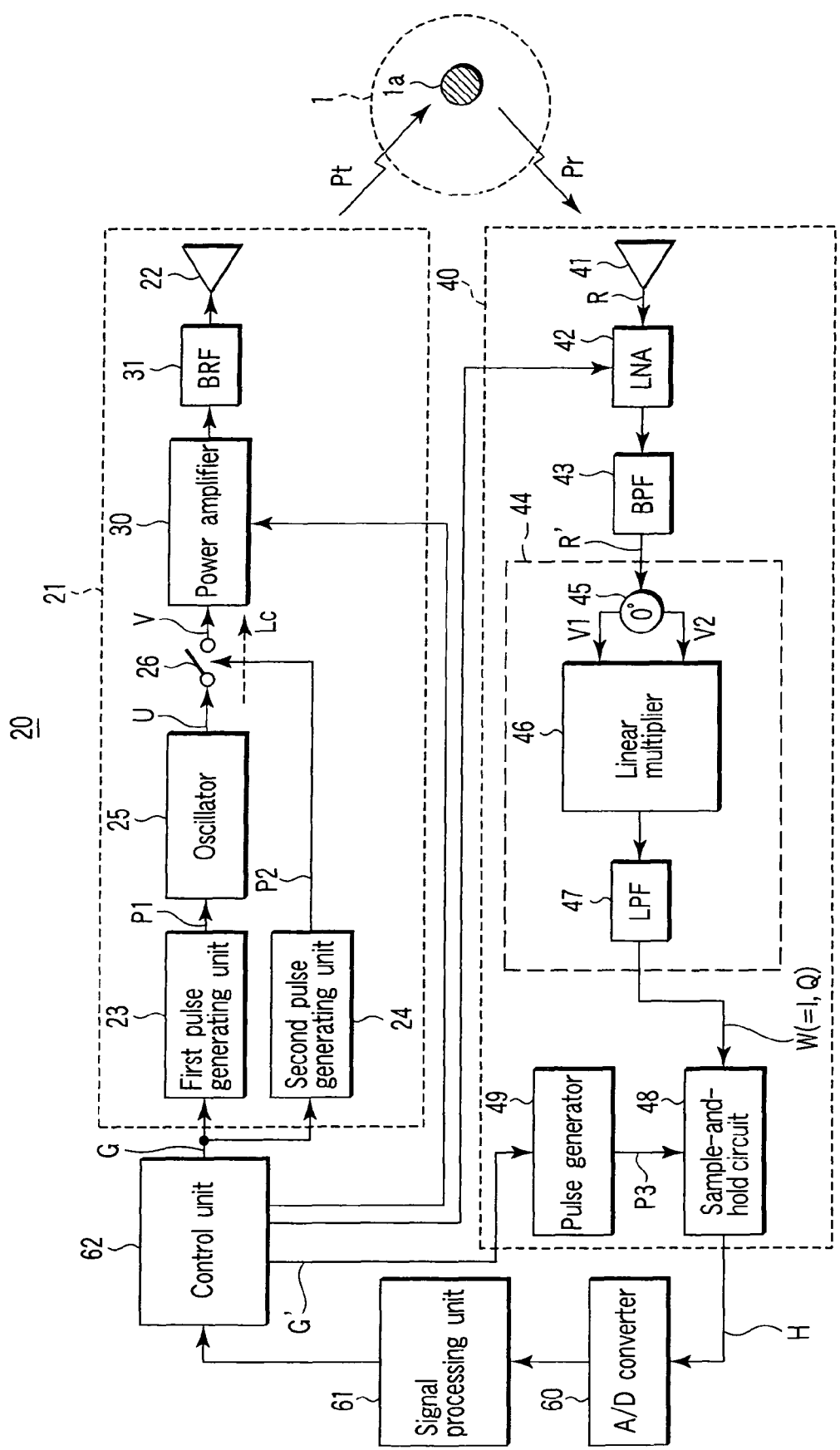
FIG. 1 is a block diagram showing the general configuration of a short-range radar and a control method thereof according to a first embodiment of the invention.

FIG. 1 is a block diagram showing the general configuration of a short-range radar and a control method thereof according to a first embodiment of the invention.

A short-range radar 20 according to this invention basically includes: a transmitting unit 21 for emitting a predetermined short pulse wave Pt from a transmission antenna 22 into a space 1; a receiving unit 40 for executing a process of receiving a reflected wave Pr from an object 1a existing in the space 1; and a signal processing unit 61 for executing a process of analyzing the object 1a based on the output signal from the receiving unit 40, wherein the transmitting unit 21 includes: a first pulse generating unit 23 for outputting a first pulse P1 having a width Tc longer than the width of the short pulse wave Pt in a predetermined period Tg; a second pulse generating unit 24 for outputting a second pulse P2 having the width corresponding to the width of the short pulse wave Pt at a timing upon the lapse of a predetermined time Ts from the time point when the first pulse generating unit 23 starts to output the first pulse P1 and during the output period thereof; an oscillator 25 for oscillating and outputting the signal in the frequency band of the short pulse wave Pt only during the period when the first pulse generating unit 23 outputs the first pulse P1; and a switch 26 for receiving an output signal U from the oscillator 25 and turned on to pass the output signal U from the oscillator 25 only during the period when the second pulse generating unit 24 outputs the second pulse P2, and an output signal V (including U') from the switch 26 is emitted into the space as the predetermined short pulse wave Pt.

Also, a method of controlling the short-range radar according to the invention basically includes: a step of preparing the transmitting unit 21 having the transmission antenna 22, the receiving unit 40 and the signal processing unit 61; a step of emitting the predetermined short pulse wave Pt from the antenna 22 into the space 1 using the transmitting unit 21; a step of executing the process of receiving the reflected wave Pr from the object 1a existing in the space 1 using the receiving unit 40; and a step of executing the process of analyzing the object 1a based on the output signal from the receiving unit 40 using the signal processing unit 61, wherein the step of emitting the predetermined short pulse wave Pt into the space 1 includes: a step of preparing the first pulse generating unit 23, the second pulse generating unit 24, the oscillator 25 and the switch 26; a step of outputting the first pulse P1 having the width Tc longer than the width of the short pulse wave Pt in a predetermined period Tg using the first pulse generating unit 23; a step of outputting, using the second pulse generating unit 24, the second pulse P2 having the width corresponding to the width of the short pulse wave Pt at the timing upon the lapse of a predetermined time Ts from the time point when the first pulse generating unit 23 starts to output the first pulse P1 and during the output period thereof; a step of causing the oscillator 25 to be oscillated and outputting a signal in the frequency band of the short pulse wave Pt only during the period when the first pulse generating unit 23 outputs the first pulse P1; a step of turning on the second pulse generating unit 24 upon receipt of the output signal U from the oscillator 25 and passing the output signal U from the oscillator 25 only during the output period of the second pulse P2 using the switch 26; and a step of emitting the output signal V (including U') from the switch 26 into the space 1 as the predetermined short pulse wave Pt.

Specifically, as shown in FIG. 1, the short-range radar 20 is configured of the transmitting unit 21, the receiving unit 40, an analog/digital (A/D) converter 60, the signal processing unit 61 and a control unit 62.

The transmitting unit 21, each time (rise timing) it receives a transmission trigger signal G output in a predetermined period Tg (for example, 1 μs) from the control unit 62 described later, as shown in (a) of FIG. 2, generates the short pulse wave (burst wave) Pt having a predetermined frequency fc (for example, 26 GHz) with a predetermined width Tp and emits it into the space 1 from the transmission antenna 22.

This transmitting unit 21, as shown in FIG. 1, in addition to the transmission antenna 22, has the first pulse generating unit 23, the second pulse generating unit 24, the oscillator 25, the switch 26, a power amplifier 30 and a band regulation filter (BRF) 31 functioning as a band-elimination filter.

The first pulse generating unit 23, as shown in (b) of FIG. 2, generates and outputs, in the period Tg, the first pulse P1 having the width Tc (assumed to be the high-level time width) longer than the width Tp of the short pulse wave Pt to be emitted to the space 1.

This time width Tc is set to a value (for example, several ns to several tens of ns) not smaller than the sum of the time Ts and the width Tp required to stabilize the amplitude and frequency of the output signal of the oscillator 25 and sufficiently shorter than the period Tg.

Also, the second pulse generating unit 24, as shown in (c) of FIG. 2, generates and outputs the second pulse P2 having the width Tp (assumed to be a high-level time width) at the timing during the period when the first pulse P1 is output from the first pulse generating unit 23 and upon lapse of a predetermined time (oscillation stabilization time) Ts from the time point when the first pulse P1 starts to be output.

Incidentally, an explanation will be made here with reference to a case in which the pulses P1, P2 are high-level pulses. Nevertheless, each of the pulses may be a low-level pulse.

The oscillator 25, as shown in (d) of FIG. 2, oscillates and outputs, only during the period when the first pulse generating unit 23 outputs the first pulse P1, a burst carrier signal U at the frequency fc of the short pulse wave Pt to be emitted into the space 1.

The oscillator 25, though adapted to be variously configured, requires a high frequency stability considering the UWB frequency assignment described above, and therefore, is required to have a resonator large in Q.

Figure 3A:
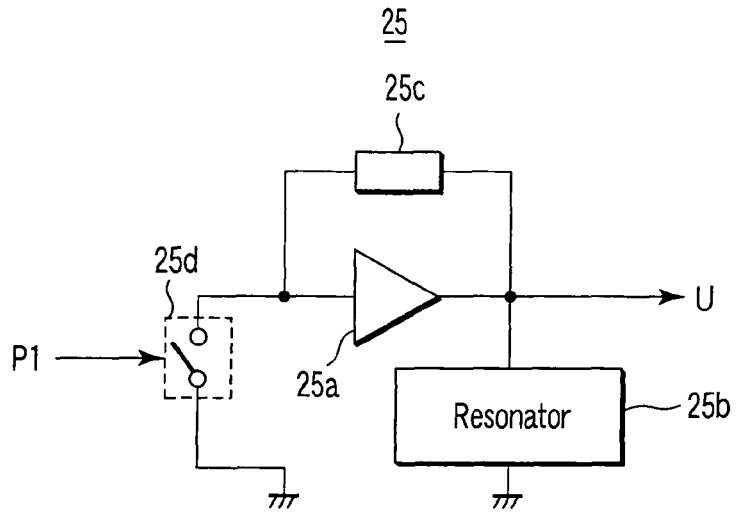
FIG. 3A is a circuit diagram showing the general configuration of the essential parts of the short-range radar and the control method thereof according to the first embodiment of the invention.

The oscillator 25 shown in FIG. 3A, for example, is configured of an amplifier 25a, a resonator 25b, a feedback circuit 25c and an oscillation control switch 25d, in which the switch 25d inserted between the signal line and the earth is turned off for the input period of the first pulse P1 thereby to achieve the oscillation state.

Figure 3B:
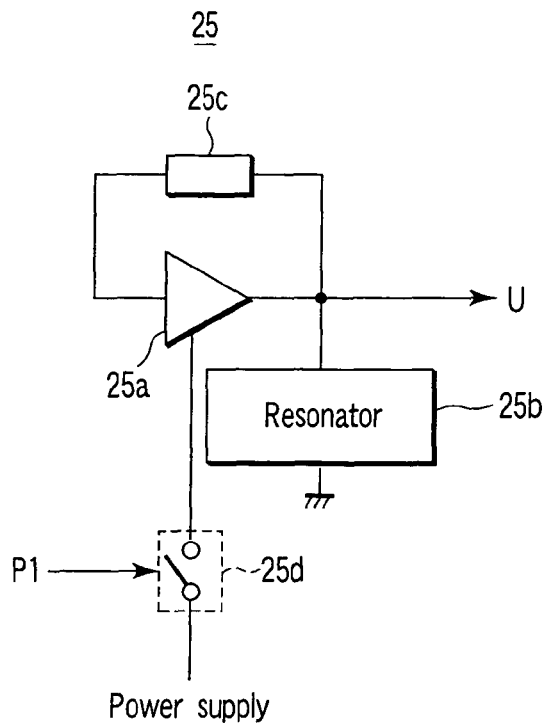
FIG. 3B is a circuit diagram showing the general configuration of the essential parts of the short-range radar and the control method thereof according to the first embodiment of the invention.

Also, as in the oscillator 25 shown in FIG. 3B, the oscillation state can be realized by turning on, for the input period of the first pulse P1, the switch 25d inserted in the power line of the amplifier 25a.

The frequency stability of the oscillator 25 having the above-mentioned configuration is determined by the magnitude of Q of the resonator 25b, and the larger the value Q of the resonator 25b, the longer the rise time, i.e. the time Ts until the amplitude and frequency of the signal U are stabilized after starting the oscillating operation as shown in (d) of FIG. 2.

As long as the time Tc is sufficiently shorter than the period Tg, the effect of the leak can be ignored even when the switch 26 not especially high in isolation is used as described above, and therefore, the spectrum mask having the specification required for the UWB short-range radar described above can be met with an inexpensive circuit configuration.

The switch 26 is kept in a signal pass mode (on state) during the period when the burst carrier signal U output from the oscillator 25 is received and the second pulse signal P2 is output from the second pulse generating unit 24, and in a signal block mode (off state) during the remaining period.

The signal V output from the switch 26, therefore, as shown in (e) of FIG. 2, contains a leak component Lc generated during the off-state of the switch 26 and a signal U' passed during the on-state of the switch 26 against the burst carrier signal U output during the period Tc when the oscillator 25 oscillates. Thus, the output signal component during the period when the oscillator 25 is not in oscillating operation is theoretically zero.

The output signal V from the switch 26 is amplified by the power amplifier 30, and with the unrequired band component thereof removed by the BRF 31, supplied to the transmission antenna 22, from which a short pulse wave Pt is emitted into the space 1.

This transmitting unit 21, as described above, oscillates the oscillator 25 with the first pulse P1, and after stabilization of the amplitude and frequency of the output signal U, turns on the switch 26 for the time Tp and outputs the short pulse wave Pt.

According to the first embodiment using the short-range radar and the control method thereof according to the invention, therefore, as compared with the configuration of the conventional short-range radar in which the short pulse wave Pt is output by turning on/off the continuous wave with a switch, the average power of the leak component can be reduced equivalently to Tc/Tg, so that the specified spectrum mask requirement for the UWB short-range radar can be met without using any switch specially high in isolation.

Next, the relation among the time width Tc of the first pulse, the time width Tp of the second pulse and the isolation of the switch 26 will be discussed.

Figure 4A:
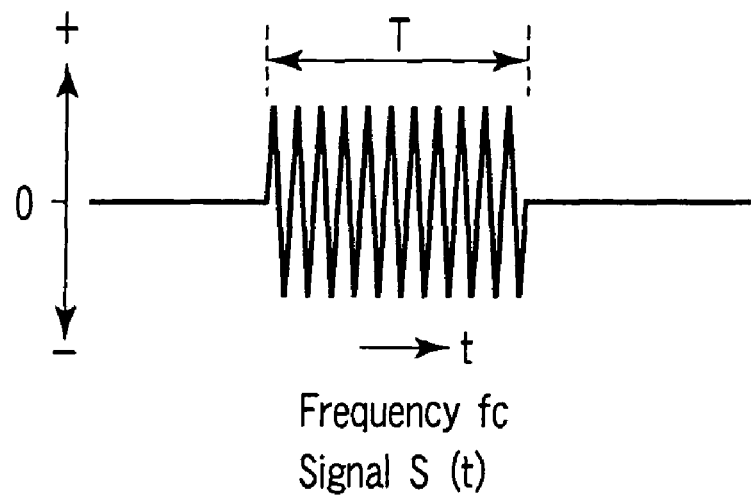
FIG. 4A is a diagram showing the signal waveform of a pulse modulation wave for explaining the operation of the essential parts of the short-range radar and the control method thereof according to the first embodiment of the invention.
Figure 4B:
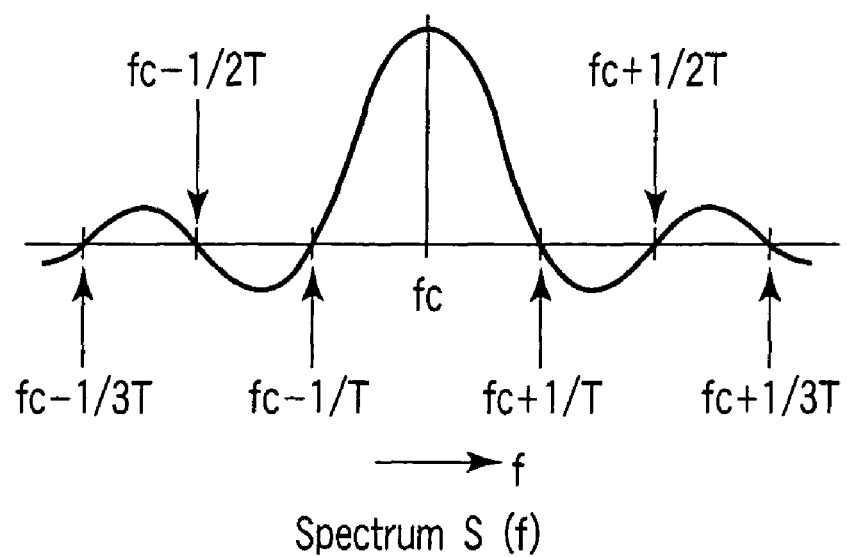
FIG. 4B is a diagram showing the spectrum of the pulse modulation wave for explaining the operation of the essential parts of the short-range radar and the control method thereof according to the first embodiment of the invention.

As shown in FIG. 4A, a signal waveform s(t) obtained by pulse modulation of the continuous wave having the frequency fc with the time width T is subjected to Fourier transform. Then, a spectrum S(f) of the sinc function (sin x/x) as shown in FIG. 4B is obtained.

This is expressed by the following equation:

$$S(f) = \sqrt{(Sp)} \cdot \{\sin [\pi T(f-fc)]\}/[\pi T(f-fc)]$$

where Sp indicates the peak power of the spectrum.

Also, FIG. 5A shows a power waveform p(t) in time domain, and FIG. 5B the power spectrum thereof.

According to Parseval's theorem, the total power in time domain is equal to the total power in frequency domain, and therefore, the following equation holds:

$$\int |s(t)|^2 dt = \int |S(f)|^2 df$$

where the symbol $\int$ indicates the integration of the time t or the frequency f for $-\infty$ to $+\infty$.

The left side of the aforementioned equation represents the integration of the square of the voltage, and the power is given as Pp·T from FIG. 5A. Thus, $$\int |s(t)|^2 dt = Pp \cdot T$$

Also, the constant integration of the square of the sinc function on the right side is expressed as $$\int |S(f)|^2 df = Sp/T$$

by using the formula: $\int [\sin^2 x/x^2] = \pi$

From the foregoing, the following relation is obtained:

$$Sp = Pp \cdot T^2$$

From this, it is understood that the spectrum peak is increased in proportion to the square of the pulse width T.

Figure 6A:
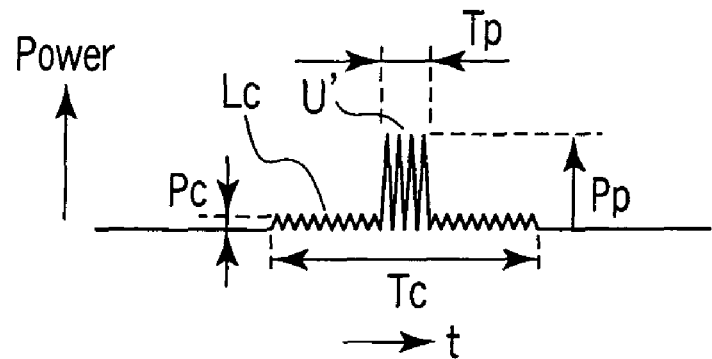
FIG. 6A is a diagram showing the power waveform of a short pulse wave for explaining the operation of the essential parts of the short-range radar and the control method thereof according to the first embodiment of the invention.

Next, consider a signal V in which the carrier signal U' of the power Pp having the time width Tp is superposed on the carrier leak of the power Pc existing only during the time width Tc as shown in FIG. 6A.

In this case, the power ratio Pp/Pc represents the isolation I of the switch 26.

The total power of the carrier signal U' and the carrier leak Lc are Pp·Tp and Pc·Tc, respectively. Using the aforementioned equations, therefore, the equivalent spectrum peaks Sp and Sc can be expressed as follows:

$$Sp = Pp \cdot Tp^2$$

$$Sc = Pc \cdot Tc^2$$

In the discussion made above, the equivalent spectrum peaks Sp and Sc are determined separately from each other.

Figure 6B:
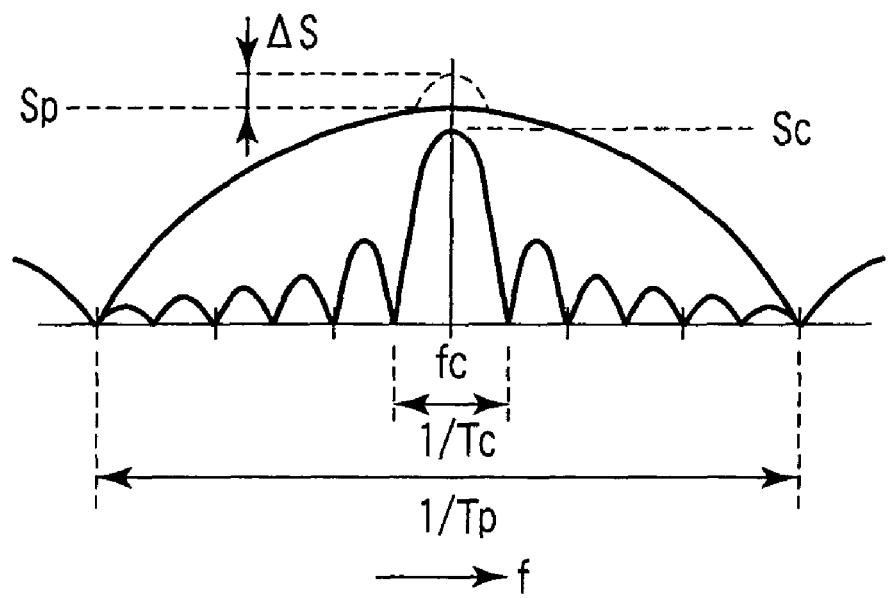
FIG. 6B is a diagram showing the power spectrum of the short pulse wave for explaining the operation of the essential parts of the short-range radar and the control method thereof according to the first embodiment of the invention.

Actually, however, as shown in FIG. 6B, the increment $\Delta S$ from the whole spectrum peak Sp representing the total of the equivalent spectrum peaks Sp and Sc is important.

FIG. 7 is a graph showing the result of determining the increment $\Delta S$ with the carrier leak time Tc and the isolation I of the switch 26 changed for the pulse width Tp of 1 ns.

Assume that the upper limit of the increment $\Delta S$ is 3 dB. In the case where the switch 26 having the isolation I of 20 dB (100 times in power ratio) is used, it is understood from FIG. 7 that the increment $\Delta S$ can be reduced to 3 dB or less for Tc of not more than 10 ns.

Also, as compared with a case in which the oscillating operation is started and stabilized with the pulse width Tp of 1 ns, the provision of the stable time of not less than 1 ns by starting the oscillating operation at 10 ns of 10 times larger in pulse width is far easier technically, and therefore, the oscillator 25 can be realized with an inexpensive configuration.

The upper limit 3 dB of the increment $\Delta S$ is associated with a case in which the equivalent spectrum peaks Sp and Sc are equal to each other.

Therefore, by determining the time width Tc of the second pulse P2 to hold the relations:

$$Pc \cdot Tc^2 \leq Pp \cdot Tp^2$$

$$(Tc/Tp)^2 \leq Pp/Pc = I$$

the increment $\Delta S$ due to the leak component can be suppressed to 3 dB or less.

Incidentally, the leak component can be minimized by setting the time width Tc of the first pulse P1 equal to the required minimum Ts+Tp while at the same time attaining the coincidence between the fall timing of the first pulse P1 (timing to end the oscillating operation) and the fall timing of the second pulse P2 (timing to turn off the switch 26).

As described above, the transmitting unit 21 of the short-range radar according to the first embodiment is adapted to output the short pulse wave by turning on the switch 26 in response to the second pulse P2 for the time length Tp in the case where a signal stable in amplitude and frequency is output from the oscillator 25 oscillated by the first pulse P1.

With the transmitting unit 21 of the short-range radar according to the first embodiment, therefore, the carrier leak from the switch 26 can be kept completely at zero during the non-output period of the first pulse P1. As a result, as long as the output period Tc of the first pulse P1 is sufficiently short as compared with the period Tg of the short pulse wave Pt, the average power of the carrier leak can be reduced even by using the inexpensive switch 26 low in isolation.

Thus, according to the first embodiment of the invention, as shown in FIG. 8, for example, the spectrum Sx of the output signal V from the switch 26 can be suppressed within the range of the specified spectrum mask required of the UWB short-range radar described above. While complying with the specified spectrum mask, therefore, a short-range radar and a control method thereof can be realized which prevent the interference with the RR prohibited band and the SRD band.

As a result, the transmitting unit 21 of the short-range radar according to the first embodiment can use, most effectively within the specified power range, the emission power level of the short pulse wave Pt thus far considerably limited by the leak power.

Also, in the first embodiment using the short-range radar and the control method thereof according to the invention, the average power of the carrier leak can be reduced and the main lobe of the short pulse wave Pt can be arranged in an arbitrary UWB band, and therefore, the substantially whole main lobe is prevented from being superposed with the RR prohibited band.

The substantially whole main lobe of the short pulse wave Pt can be based on the range from the peak of the spectrum Sx to −20 dB as one standard.

In the case where the peak is −41.3 dBm/MHz in the process, the level of the lower side of the main lobe of the short pulse wave Pt is always equal to the specified level −61.3 dB/MHz or less in the RR prohibited band, and the specified spectrum mask is satisfied.

In the case where the side lobe level of the short pulse wave Pt is higher than −61.3 dB/MHz in the RR prohibited band, however, the side lobe level of the short pulse wave Pt is required to be attenuated not to exceed −61.3 dB/MHz in the RR prohibited band by the notch function of the transmission antenna 22 or the BRF 31 described later.

The output signal V from the switch 26, after being amplified to the specified power by the power amplifier 30, is supplied to the transmission antenna 22 through the BRF 31 and emitted as a short pulse wave Pt from the transmission antenna 22 into the space 1 to be explored.

Figure 9:
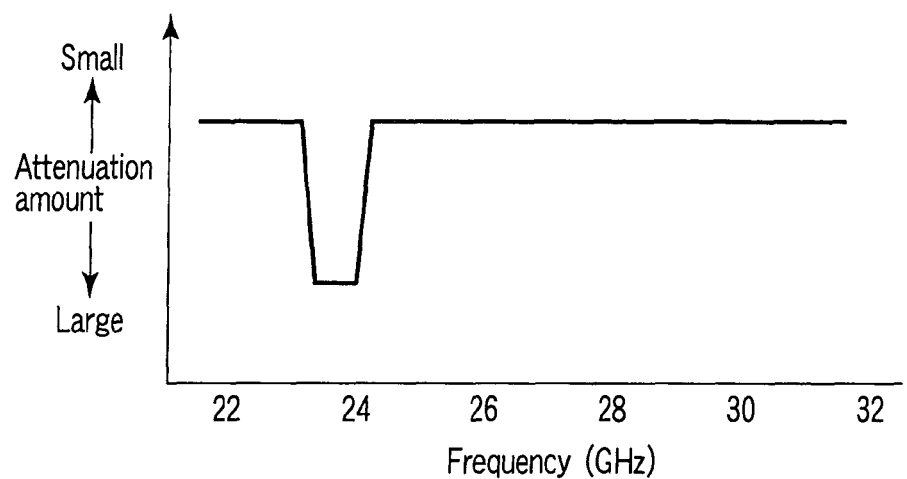
FIG. 9 is a characteristic diagram of a band regulation filter (BRF) for explaining the operation of the essential parts of the short-range radar and the control method thereof according to the first embodiment of the invention.

The BRF 31, as shown in FIG. 9, for example, is a notch filter having a large attenuation characteristic against the RR prohibited band of 23.6 to 24 GHz, whereby the emission level to the RR prohibited band is further reduced.

Incidentally, the gain of the power amplifier 30 is adapted to be changed by the control unit 62 described later.

The transmission antenna 22 for emitting the short pulse wave Pt into the space 1 is required to have a wide band characteristic to emit the UWB short pulse wave Pt effectively into the space.

The short-range radar according to the first embodiment uses a circularly polarized antenna having a spiral element as an antenna usable in the UWB wide band.

In place of the circularly polarized antenna using the spiral element, a linearly polarized antenna with a bow-tie antenna or the like as an element can of course be used.

FIGS. 10 to 14 show the basic structure of the transmission antenna 22.

The transmission antenna 22 includes a dielectric substrate having a thickness of 1.2 mm and a low dielectric constant (about 3.5), for example, a ground-plane conductor 122 arranged on one surface (back surface in FIGS. 10, 11) of the dielectric substrate 121, an unbalanced antenna element 123 in the form of a clockwise rectangular spiral formed as a pattern on the reverse surface (front surface in FIGS. 10, 11) of the dielectric substrate 121, and a feed pin 125 with an end thereof connected to the end (feed point) of the antenna element 123 near the spiral center and passed through a hole 122a of the ground-plane conductor 122 along the thickness of the dielectric substrate 121.

By feeding from the other end of the power feed pin 125 through an unbalanced feed line such as a coaxial cable, a coplanar line with the ground-plane conductor 122 as an earth line or a microstrip line described later, the left-hand circularly polarized radiowave can be emitted from the antenna element 123.

In the antenna having this structure, however, the surface wave along the surface of the dielectric substrate 121 may be excited and the desired characteristic cannot be obtained due to the effect of the surface wave.

Figure 13:
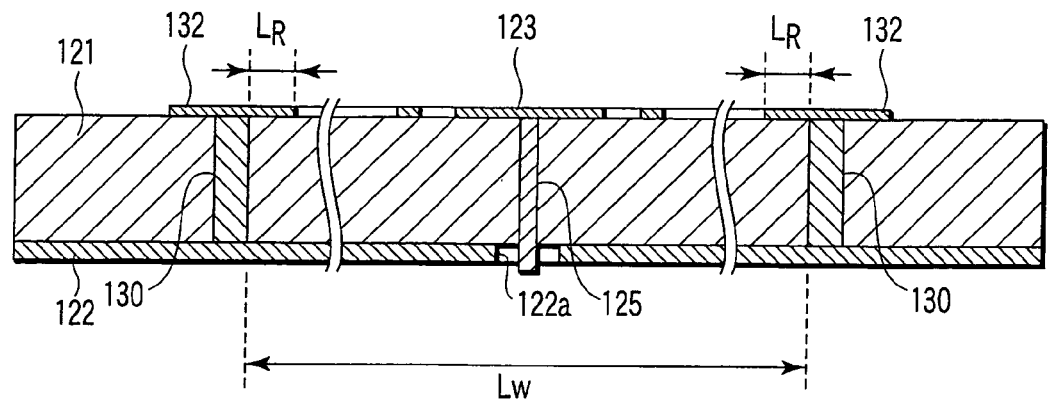
FIG. 13 is a sectional view taken in line 13-13 in FIG. 11 for explaining the configuration of the essential parts of the short-range radar and the control method thereof according to the first embodiment of the invention.
Figure 14:
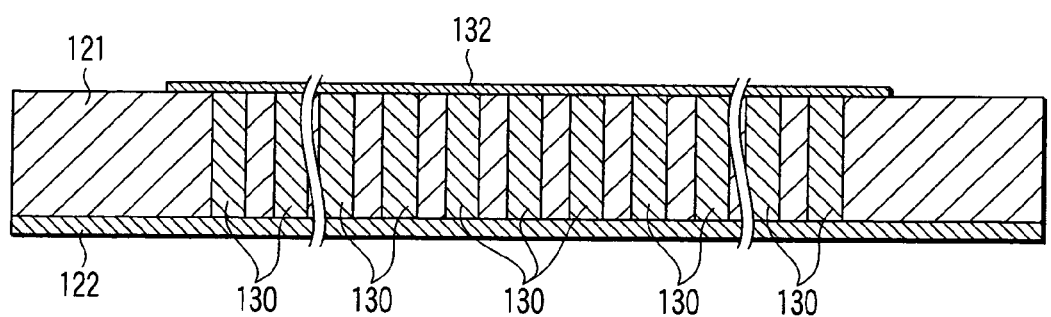
FIG. 14 is a sectional view taken in line 14-14 in FIG. 11 for explaining the configuration of the essential parts of the short-range radar and the control method thereof according to the first embodiment of the invention.

In view of this, with the transmission antenna 22 according to the first embodiment, as shown in FIGS. 13, 14, a plurality of metal posts 130, in the form of pins with one end connected to the ground-plane conductor 122 and the other end extended to the other surface of the dielectric substrate 121 through the dielectric substrate 121, are arranged at predetermined intervals in such positions as to surround the antenna element 123 thereby to make up a cavity structure. Further, the other ends of the metal posts 130 are sequentially shorted along the direction in which they are arranged on the other surface of the dielectric substrate 121, while at the same time arranging a conducting rim 132 extending a predetermined distance toward the antenna element 123 from the connecting point with each metal post 130 thereby to suppress the surface wave.

Assume that the distance (hereinafter referred to as the rim width) by which the conducting rim 132 extends inward from the inner wall of the cavity is designated as $L_R$.

The rim width $L_R$ corresponds to one of several parts of the propagation wavelength of the radiowave in the cavity.

In this case, the plural metal posts 130 are realized, for example, by plating (through-hole plating) on the inner wall of the plural holes formed through the dielectric substrate 121.

The cavity having this conducting rim 132 is excited by the spiral, so that the surface wave is suppressed, and a circularly polarized antenna having the directivity high in symmetry over a wide band can be obtained.

A linearly polarized antenna having the wide band characteristic similar to the circularly polarized antenna and having the surface wave suppressed can be obtained also by exciting the cavity with a linearly polarized antenna element such as a bow-tie antenna.

Figure 10:
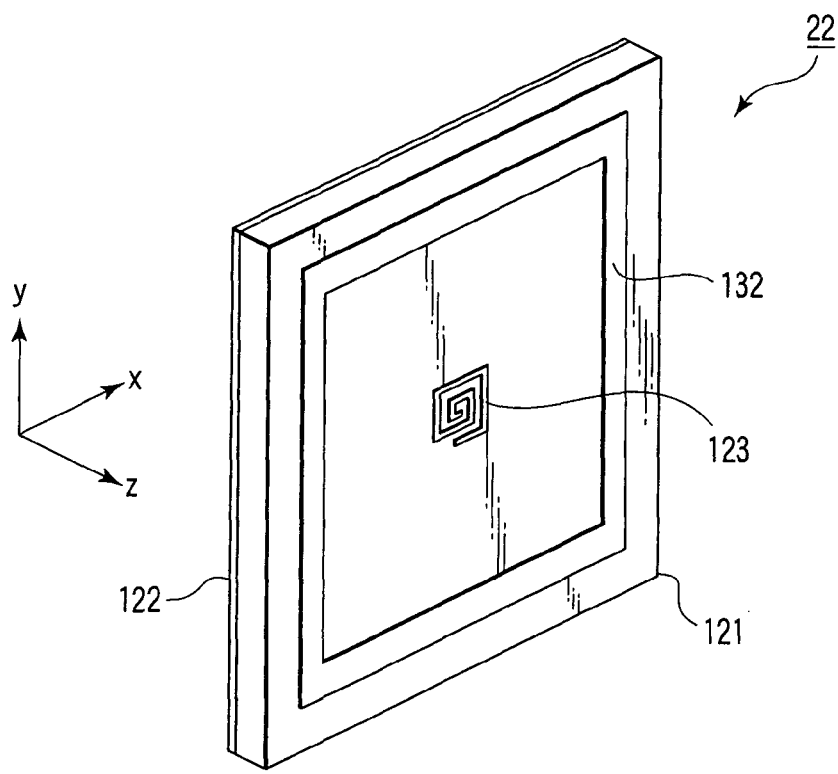
FIG. 10 is a perspective view of a transmission antenna for explaining the configuration of the essential parts of the short-range radar and the control method thereof according to the first embodiment of the invention.

The transmission antenna 22 shown in FIG. 10 can be used independently for various UWB communication systems.

In the case where the transmission antenna 22 shown in FIG. 10 is itself insufficient in the gain required as a UWB short-range radar or in the case where the beam is required to be reduced, the transmission antenna 22 may be formed in an array.

Also, in the case where the circularly polarized antenna is formed in an array, a sequential rotation array can be employed by which the cross polarized wave can be suppressed and the polarization characteristic of the antenna as a whole can be improved.

The sequential rotation array, as disclosed in Non-Patent Document 3 described below, is an array antenna with the same N antenna elements arranged on the same plane, in which each antenna element is arranged sequentially at positions rotated by $p \cdot \pi/N$ radian around the axis in the direction of emission, while at the same time shifting the phase of power feed to each antenna element by $p \cdot \pi/N$ radian in accordance with the angle of arrangement thereof, where p is an integer not less than 1 but not more than N−1.

By employing the structure disclosed in Non-Patent Document 3: T. Teshirogi et al., "Wideband Circularly Polarized Array Antenna with Sequential Rotation and Phase Shift of Elements," ISAP-85, 024-3, pp. 117-120, 1985, the cross polarized components are offset and a substantially complete circular polarization characteristic can be obtained for the antenna as a whole even in the case where each antenna element has an incomplete polarization characteristic of a circularly polarized wave (i.e., elliptically polarized wave).

Figure 15:
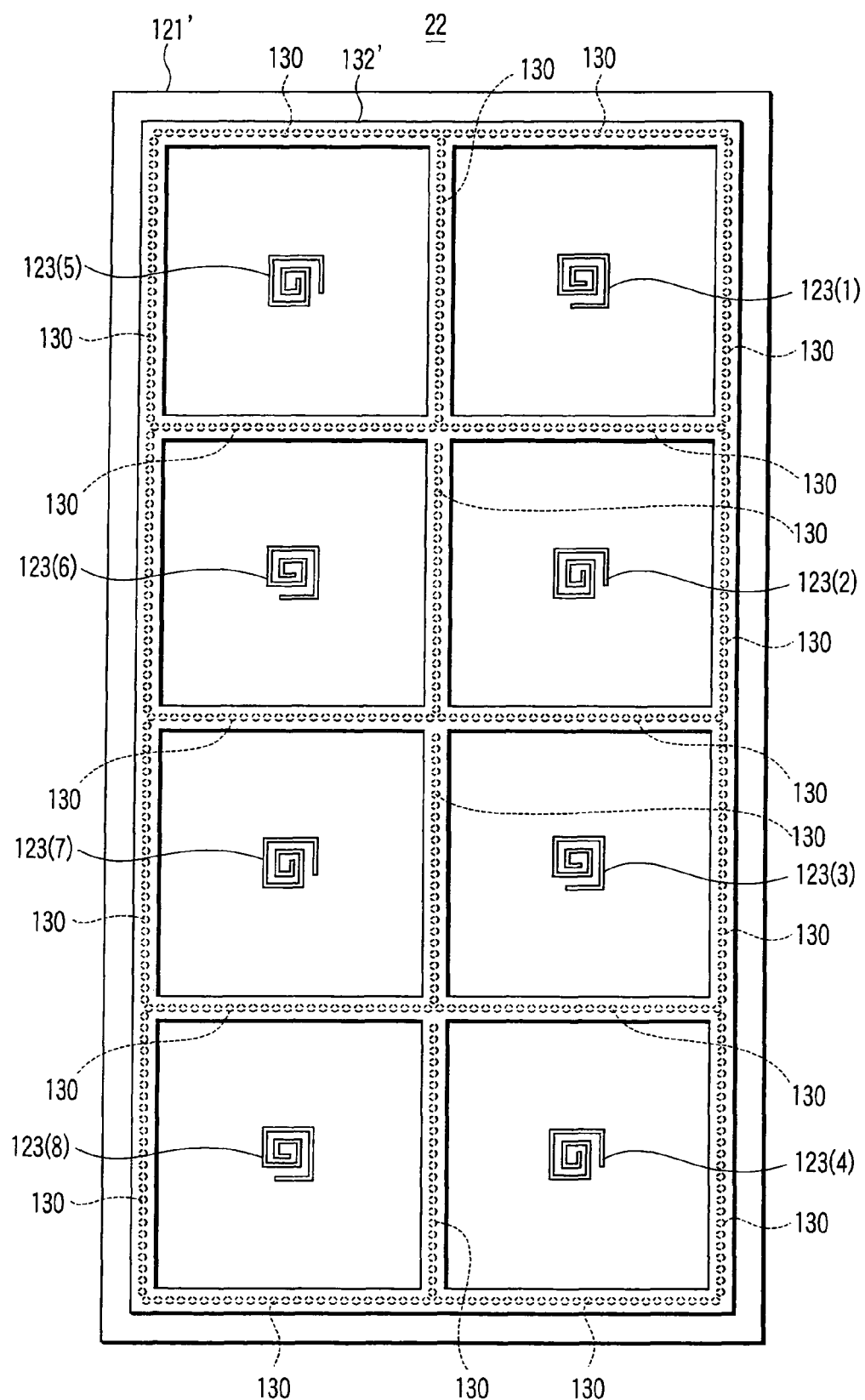
FIG. 15 is a plan view of an array-type transmission antenna for explaining the configuration of the essential parts of the short-range radar and the control method thereof according to the first embodiment of the invention.

FIG. 15 shows the configuration of the transmission antenna 22 formed in an array based on the principle described above.

This transmission antenna 22 includes the antenna elements 123 in an array of two columns and four stages formed on a longitudinally rectangular common dielectric substrate 121' and a ground-plane conductor not shown.

Also, a feed unit (not shown) for feeding the excitation signal distributively to the plural antenna elements is formed on the ground-plane conductor side of the antenna 22.

The surface of the dielectric substrate 121' is formed with eight antenna elements 123(1) to 123(8) in two columns and four stages in the form of a right-hand rectangular spiral as in the case of FIG. 10.

Also, the antenna elements 123(1) to 123(8) are each surrounded by a cavity formed of plural metal posts 130 arranged with each one end thereof connected to the ground-plane conductor on the one hand, while the other ends of the metal posts 130 are connected along the direction of arrangement thereof by the conducting rim 132' extended by a predetermined distance (corresponding to the rim width LR described above) toward each antenna element 123 from the connecting point of each metal post 130 on the other hand. In this way, the generation of the surface wave of each antenna element is suppressed.

The transmission antenna 22 described above can be considered to be configured of a resonator by the provision of the conducting rim 132' and the cavity array due to the metal posts 130 on the dielectric substrate 121', which resonator is excited by the circularly polarized antenna elements.

The resonator has a resonance frequency, at which the input impedance of the antenna is so large that the transmission antenna 22 fails to emit any signal.

In this case, the resonance frequency is determined by the structural parameters of the circularly polarized antenna elements and the resonator.

As a result, the frequency characteristic of the antenna gain of the transmission antenna 22 having the aforementioned configuration develops a deep notch steeply falling in the neighborhood of the resonance frequency.

By setting this resonance frequency in coincidence with the RR prohibited band (23.6 to 24.0 GHz), for example, the interference with the earth exploration satellite service (EESS) by the short pules wave Pt emitted from the short-range radar using the transmission antenna 22 can be remarkably reduced.

In consideration of this point, FIG. 16 shows the result of test-producing the transmission antenna 22 having the configuration shown in FIG. 15 and measuring the frequency characteristic of the gain of the right-hand circular polarization (RHCP) component of the main polarized wave and the left-hand circular polarization (LHCP) component of the cross polarized wave of the transmission antenna 22.

From the example shown in FIG. 16, it is understood that the main polarized wave component has the gain of not less than 13 dBi over the range of 24.5 to 31 GHz, and a steep notch with a fall of about 20 dB from the peak level is generated in the RR prohibited band.

The frequency generating this notch can be easily rendered to coincide with the RR prohibited band by appropriately selecting the structural parameters of the resonator and/or the spiral antenna.

By setting the notch frequency in coincidence with the RR prohibited band, therefore, the level of radiowave emission to the RR prohibited band can be reduced easily by at least 20 dB in collaboration with the carrier leak reduction technique described above. Thus, the new spectrum mask in accordance with the FCC recommendation described above can be satisfied.

This can be realized without the BRF 31, and therefore, the space for installing the BRF 31 is not required, thereby producing the advantage that the insertion loss by the BRF 31 is not caused.

The short pulse wave Pt emitted into the space 1 from the transmission antenna 22 having this configuration is reflected from an object 2 in the space 1 and the resulting reflected wave Pr is received by the receiving antenna 41 of the receiving unit 40.

This receiving antenna 41 can have the same configuration as the transmission antenna 22.

The circularly polarized radiowave, however, has such a property as to be inverted in the direction of polarized rotation by reflection, and therefore, by setting the polarized rotation of the receiving antenna 41 in the direction opposite to that of the transmission antenna, the secondary reflection component (or more strictly, the even-numbered reflection component) at the receiving antenna 41 can be suppressed for an improved selectivity of the primary reflection component (more strictly, the odd-numbered reflection component). Thus, the false echo generated by the secondary reflection at the receiving antenna 41 can be reduced.

The receiving signal R output from the receiving antenna 41 that has received the reflected wave Pr, after being amplified by a low-noise amplifier (LNA) 42, is limited in band by the bandpass filter (BPF) 43 having the band width of about 2 GHz.

Incidentally, the gain of the LNA 42 can be changed by the control unit 62.

The receiving signal R' limited in band is input to and detected by a detection circuit 44.

The detection circuit 44, though of various types including the quadrature demodulation type, is assumed to be of square detection type, of which an example is explained below.

Specifically, the detection circuit 44 of square detection type includes a diverging circuit 45 for diverging the receiving signal R' output from the BPF 43 into a pair of signals V1, V2 in the same phase (0°), a linear multiplier 46 for linearly multiplying the pair of signals V1, V2 in the same phase into which the receiving signal R' has been diverged, and a low-pass filter (LPF) 47 for extracting the baseband component W (=I, Q) from the output signal of the linear multiplier 46.

The linear multiplier 46, though of several types including the one using a double balanced mixer, is assumed to be of a type configured using the Gilbert mixer for high speed operation.

The Gilbert mixer, as shown in FIG. 17, has three differential amplifiers 46a, 46b, 46c.

The first differential amplifier 46a including transistors Q1, Q2, emitter resistors R1, R2 and a constant current source I is differentially supplied with the first signal V1 of the pair of signals V1, V2.

Also, the second and third differential amplifiers 46b, 46c including transistors Q3, Q4 and transistors Q5, Q6 connected to the load side of the first differential amplifier 46a are supplied with the second signal V2 of the pair of signals V1, V2.

As a result, only the signal component equal to the product V1×V2 or −(V1×V2) of the first signal V1 and the second signal V2 is output from the load resistors R3, R4 connected to each load side of the second and third differential amplifiers 46b, 46c.

Incidentally, in FIG. 17, Vb1, Vb2 and Vb3 designate the bias power supplies for the first, second and third differential amplifiers 46a, 46b and 46c, respectively.

Figure 18:
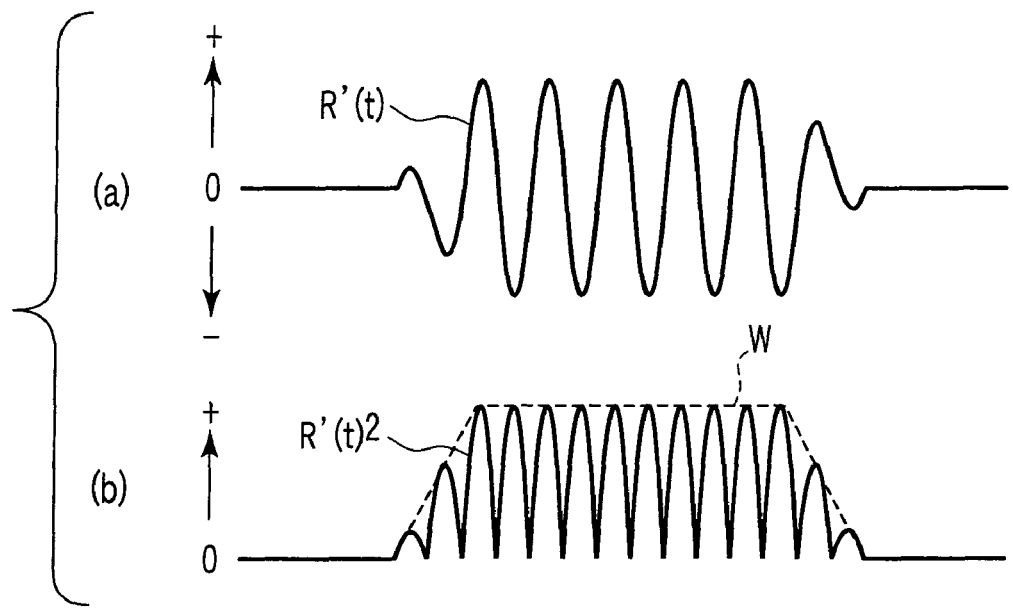
FIG. 18 is a waveform diagram for explaining the operation of the essential parts of the short-range radar and the control method thereof according to the first embodiment of the invention.

Upon application of a sinusoidal signal R'(t) to this linear multiplier 46 in burst form as shown in (a) of FIG. 18 as the pair of signals V1, V2 in the same phase, the output signal thereof, as shown in (b) of FIG. 18, assumes a waveform $R'(t)^2$ as the square of the input signal R'(t), and the envelope (baseband) W thereof is proportional to the power of the input signal R'(t).

The linear multiplier 46 making up the Gilbert mixer formed of a plurality of differential amplifiers described above can be configured in a very compact form of a monolithic microwave integrated circuit (MMIC). Further, the local signal is not required to be supplied, and therefore, the power consumption is advantageously small.

The baseband signal W obtained from the detection circuit 44 is input to a sample-and-hold circuit 48.

Figure 19:
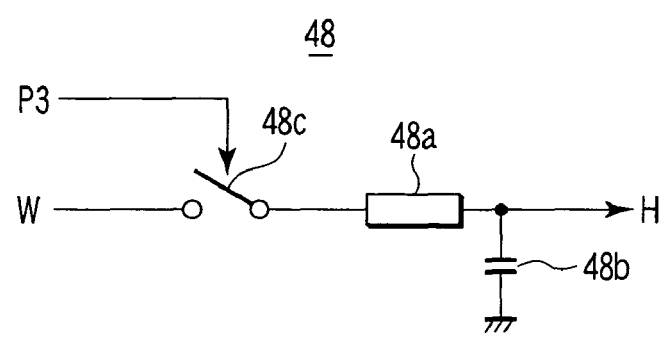
FIG. 19 is a circuit diagram for explaining the configuration of the essential parts of the short-range radar and the control method thereof according to the first embodiment of the invention.

The sample-and-hold circuit 48, with the principle thereof shown in FIG. 19, is so configured that the baseband signal W is input to the integrated circuit including a resistor 48a and a capacitor 48b through a switch 48c. As long as a pulse signal P3 from a pulse generator 49 is kept at high level (or low level), the switch 48c is closed and the baseband signal W is integrated, while the switch 48c is opened and the integration result held when the pulse signal P3 falls to low level.

The pulse generator 49 generates the pulse signal P3 of a predetermined width Td and outputs it to the sample-and-hold circuit 48 each time a receiving trigger signal G' output at least time Ts behind the transmission trigger signal G is received from the control unit 62.

This receiving unit 40, therefore, executes the receiving process including the process of detecting the reflected wave Pr received before the lapse of a predetermined time T3 from the time of receipt of the receiving trigger signal G'.

Incidentally, though not shown, the width Td of the pulse signal P3 can be changed by the control unit 62.

The signal H integrated and held by the sample-and-hold circuit 48, after being converted into a digital signal by the A/D converter 60 immediately following the holding thereof, is input to the signal processing unit 61.

The signal processing unit 61, based on the signal H obtained by the receiving unit 40, analyzes the object 1a existing in the space 1, and notifies the analysis result to an output device not shown (such as a display or a voice generator) while at the same time notifying the control unit 62 of the information required for the control operation.

The control unit 62, in accordance with a predetermined schedule for the short-range radar 20 or the processing result of the signal processing unit 61, performs various control operations (variable control of the delay time between the trigger signals G, G', etc.) on at least one of the transmitting unit 21 and the receiving unit 40 and thus causes the short-range radar to investigate the area in the desired range.

Incidentally, in the oscillator 25 of the transmitting unit 21, the switch circuit 25d is closed between the input side of the amplifier 25a and the earth line as shown in FIG. 3 to prevent the positive feedback (stop the oscillation).

As an alternative, the switch circuit 25d is adapted to be closed between the output side of the amplifier 25a and the earth line, i.e. the two ends of the resonator 25b thereby to stop the oscillation.

Also, the resonator 25b used for the oscillator 25 is not necessarily of LC type but may be configured of transmission path type (such as λ/4 type).

Second Embodiment

FIG. 20A is a block diagram showing the general configuration of a second embodiment using the short-range radar and the control method thereof according to the invention.

Incidentally, in FIG. 20A, the parts configured similarly to those of the short-range radar according to the first embodiment shown in FIG. 1 described above are designated by the same reference numerals, respectively, and not described again.

According to the first embodiment described above, the linear multiplier 46 of square detection type requiring no local signal is employed as the detection circuit 44 of the receiving unit 40. According to the second embodiment, in contrast, a quadrature demodulator 51 of quadrature demodulation type requiring the local signal is employed as the detection circuit 4 of the receiving unit 40.

The use of this quadrature demodulator 51 of quadrature demodulation type requires the local signal equal in frequency to the receiving signal, and the burst carrier U output from the oscillator 25 of the transmitting unit 21 may be used as such a local signal.

As described above, however, the output period Tc of the burst carrier U cannot be lengthened greatly in order to suppress the average power of the carrier leak.

Unless the exploration range of the short-range radar is very long, however, the detection method of quadrature demodulation type using, as the local signal, the burst carrier U output from the oscillator 25 of the transmitting unit 21 can be used.

The second embodiment, therefore, is applicable to a case where the exploration range of the short-range radar is not very long, and has the feature that it can be realized with a simple configuration.

Incidentally, the configuration of this second embodiment is not explained here as it can be realized in such a manner that a variable delay unit 50 shown in FIGS. 20B, 20C in a third embodiment described later is omitted and the burst carrier U output from the oscillator 25 of the transmitting unit 21 is input directly as a local signal to the quadrature demodulator 51.

Third Embodiment

Figure 20B:
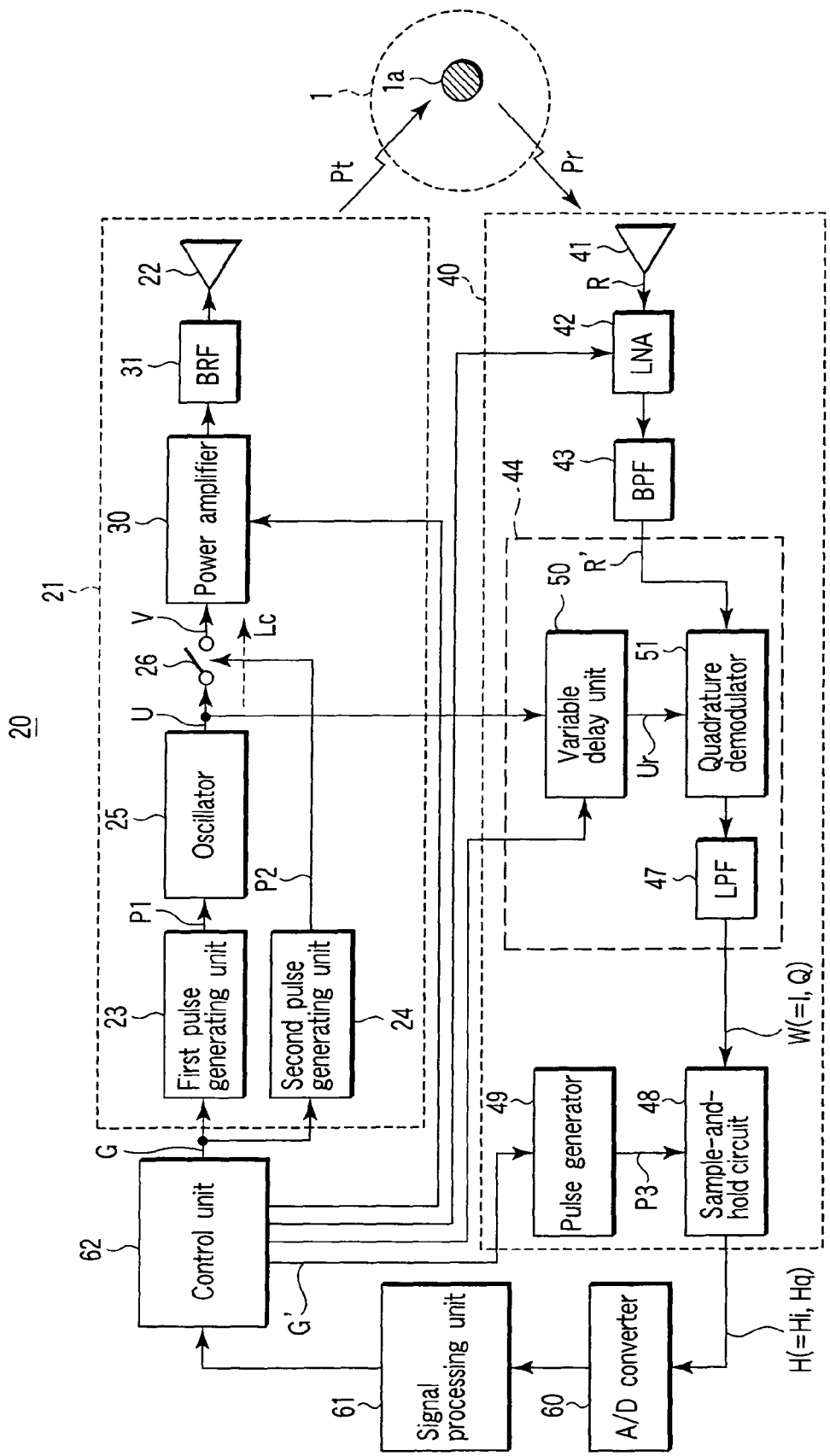
FIG. 20B is a block diagram showing the general configuration of a short-range radar and a control method thereof according to a third embodiment of the invention.

FIG. 20B is a block diagram showing the general configuration of a third embodiment using the short-range radar and the control method thereof according to this invention.

Incidentally, in FIG. 20B, the parts configured similarly to those of the short-range radar according to the first embodiment shown in FIG. 1 described above are designated by the same reference numerals, respectively, and not explained any more.

The second embodiment described above is applicable to a case in which the exploration range of the short-range radar is not very long, while the third embodiment is used in a case where the exploration range of the short-range radar is long.

In the case where the exploration range of the short-range radar is long, the output period Tc of the burst carrier U output from the oscillator 25 of the transmitting unit 21 is lengthened, thereby posing the problem that the carrier leak is increased.

To obviate this problem, according to the third embodiment, like the short-range radar 20 shown in FIG. 20B, the burst carrier U output from the oscillator 25 of the transmitting unit 21 is appropriately delayed by the variable delay unit 50 and applied as a local signal Ur to the quadrature demodulator 51.

Specifically, in the short-range radar according to the third embodiment, the exploration range of the short-range radar is considered capable of being shifted by controlling the delay amount of the variable delay unit 50.

Incidentally, the outputs of two systems including the baseband components I, Q from the quadrature demodulator 51 are shown collectively in one system in FIGS. 20A, 20B.

Actually, however, as shown in FIG. 20C, the outputs of two systems including the baseband components I, Q from the quadrature demodulator 51 are processed by two systems in each subsequent unit of the LPF 47, the sample-and-hold circuit 48 and the A/D converter 60.

This quadrature demodulator 51 is what is called the quadrature detector having the internal structure shown in FIG. 20C.

Specifically, the receiving signal R' from the BRF 43 is divided into two signals having the phase difference of 90° by a phase shifter 51a and input to two mixers 51b, 51c, respectively.

These two mixers 51b, 51c, supplied with the local signals (in this case, the local signal Ur delayed by the variable delay unit 50) in the same phase, output signals including the baseband components I, Q, respectively.

The outputs of the two mixers 51b, 51c are input to the two LPFs 47a, 47b, respectively.

The two LPFs 47a, 47b extract the baseband components I, Q and output them to the two sample-and-hold circuits 48a, 48b.

The baseband components I, Q integrated and held by the sample-and-hold circuits 48a, 48b are converted into digital signals by two A/D converters 60a, 60b, respectively, and supplied to the signal processing unit 61.

Incidentally, the quadrature demodulator 51 can be used also with a configuration in which the receiving signal R' and the local signal Ur are replaced with each other in FIGS. 20A, B, C.

Figure 21:
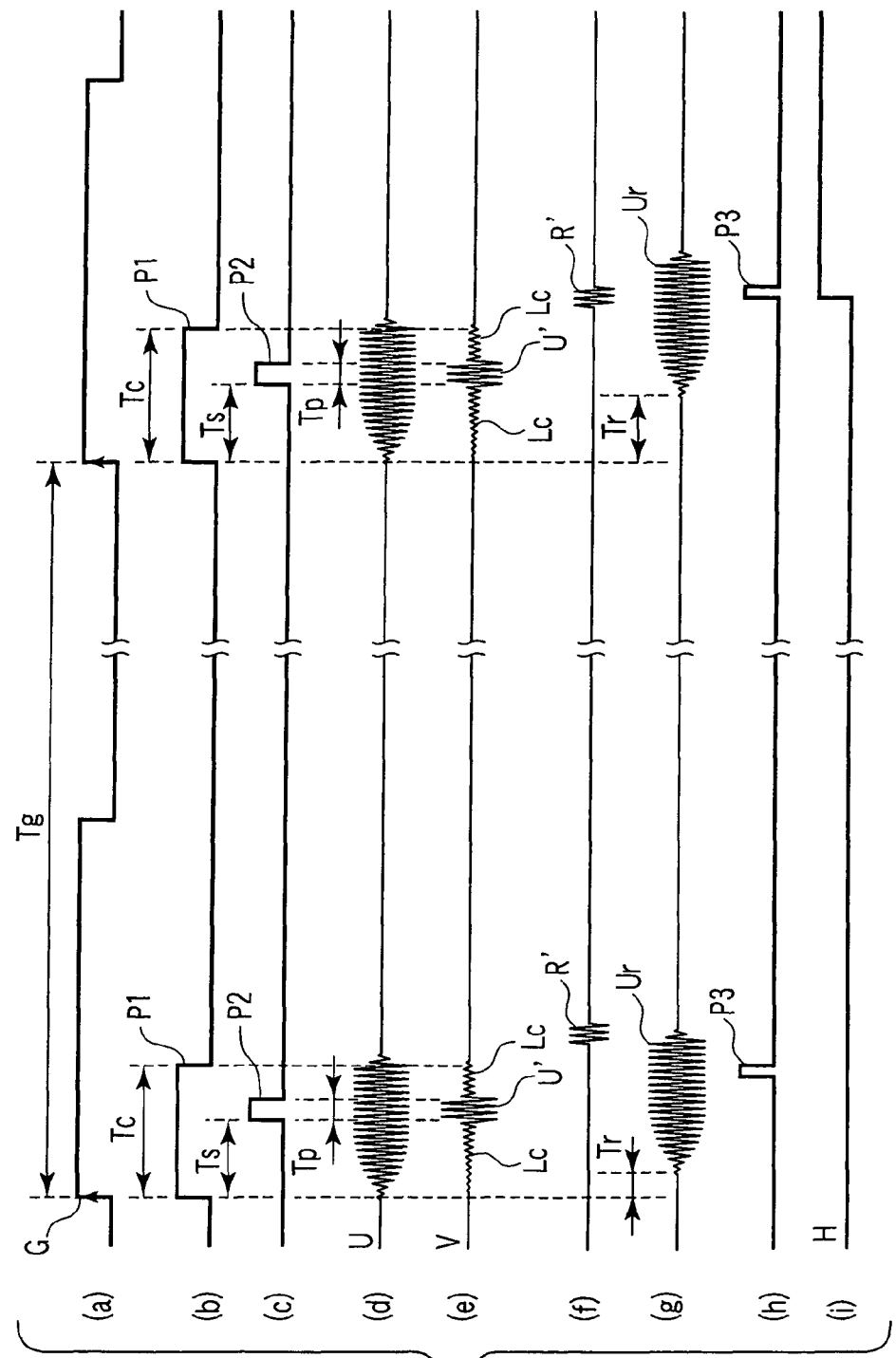
FIG. 21 is a timing chart for explaining the operation of the essential parts of a short-range radar and a control method thereof according to the third embodiment of the invention.

In the short-range radar 20 having the configuration shown in FIG. 20B, the operation similar to the one shown in FIG. 2 is performed at the transmitting end in the manner shown in (a) to (e) of FIG. 21 so that the short pulse wave Pt is emitted into the space.

The reflected wave Pr is received from the object 1a existing in the space, and the receiving signal R' is input to the quadrature demodulator 51, for example, at the timing shown in (f) of FIG. 21.

In this case, as shown in (g) of FIG. 21, assuming that the local signal Ur delayed by the time Tr under the control of the control unit 62 is input to the quadrature demodulator 51 at a timing not superposed with the receiving signal R', the output W (=I, Q) of the detection circuit 44 is substantially zero.

In the case where the delay time Tr of the local signal Ur is further increased and the local signal Ur is input to the quadrature demodulator 51 at a timing superposed with the receiving signal R', on the other hand, the signal W (=I, Q) corresponding to the amplitude and phase of the receiving signal R' is output during the superposed period.

As shown in (h) of FIG. 21, assume that the pulse P3 is applied to the sample-and-hold circuit 48 in superposition with the input period of the receiving signal R' at a timing when the frequency and amplitude of the local signal Ur are stable. As shown in (i) of FIG. 21, the holding output H (=Hi, Hq) corresponding to the receiving signal R' is obtained and converted into a digital signal by the A/D converter 60 (60a, 60b).

Based on this digital signal, the signal processing unit 61 executes the process of analyzing the object 1a.

As described above, with the short-range radar according to the third embodiment in which the burst carrier U used at the transmitting end is delayed and used as a local signal of the quadrature demodulator 51 at the receiving end, as in the transmission, the carrier signal is output only for a short time only at the timing required for receiving. As compared with a case in which the receiving carrier signal is continuously output, therefore, the emission strength of the carrier signal leaking from the receiving end can also be sufficiently reduced.

Also, in the short-range radar according to the third embodiment, only the variable delay unit 50 is added with the quadrature demodulator 51 as a system configuration. Therefore, a highly sensitive detection process can be realized by a comparatively simple configuration.

Fourth Embodiment

FIG. 22 is a block diagram showing the general configuration of a fourth embodiment using the short-range radar and the control method thereof according to this invention.

Incidentally, in FIG. 22, the parts configured similarly to those of the short-range radar according to the first embodiment shown in FIG. 1 described above are designated by the same reference numerals, respectively, and not explained any more.

The short-range radar 20 according to the fourth embodiment shown in FIG. 22 employs a configuration in which the frequency of a local signal Lvco output continuously to the quadrature demodulator 51 from a VCO 56 is locked by the burst carrier U and thus stabilized using a phase-locked loop (PLL) configuration including frequency dividers 54, 55 having the same frequency dividing ratio, a voltage-controlled transmitter (VCO) 56, a phase comparator 57 and a hold circuit 58.

Incidentally, the frequency dividers 54, 55 may be omitted.

In this case, the hold circuit 58, upon receipt of the second pulse P2, applies the output signal of the phase comparator 57 to the VCO 56 and locks the phase and frequency of the local signal Lvco through the burst carrier U for a predetermined time (for example, from rise to fall of the second pulse P2) when the burst carrier U is input and the frequency thereof stabilized. Upon lapse of the predetermined time, the frequency shift of the local signal Lvco in the free-running state is minimized by supplying the VCO 56 with the output signal of the phase comparator 57 held immediately before the end of the particular predetermined period.

In this case, the local signal Lvco is a continuous wave, and therefore, the signal extraction in the exploration range is carried out by the sample-and-hold circuit 48.

Incidentally, in FIG. 22, the outputs of two systems including the baseband components I, Q from the quadrature demodulator 51 are collectively shown as one system.

Actually, however, as shown in FIG. 20C, the outputs of the two systems including the baseband components I, Q from the quadrature demodulator 51 are processed subsequently by two systems also in each of the LPFs 47*a*, 47*b*, the sample-and-hold circuits 48*a*, 48*b* and the A/D converters 60*a*, 60*b*.

Figure 23:
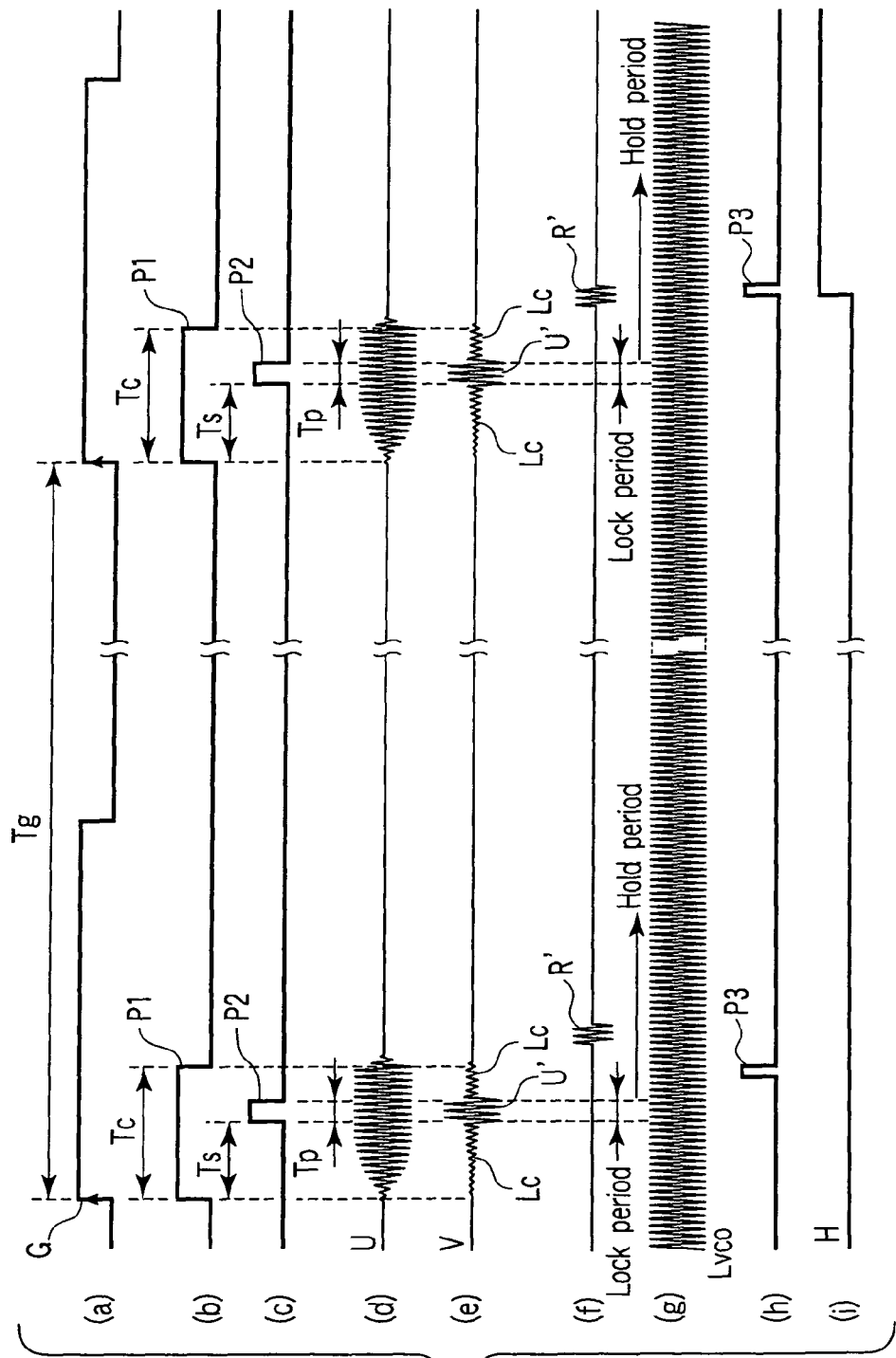
FIG. 23 is a timing chart for explaining the operation of essential parts of a short-range radar and a control method thereof according to the fourth embodiment of the invention.
Figure 24:
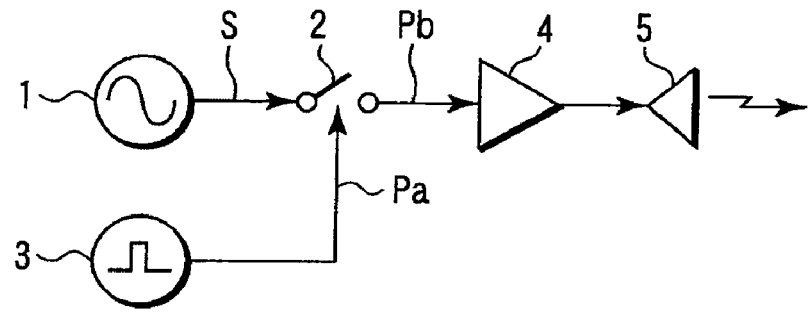
FIG. 24 is a block diagram showing the general configuration of a short-range radar according to the prior art.
Figure 25:
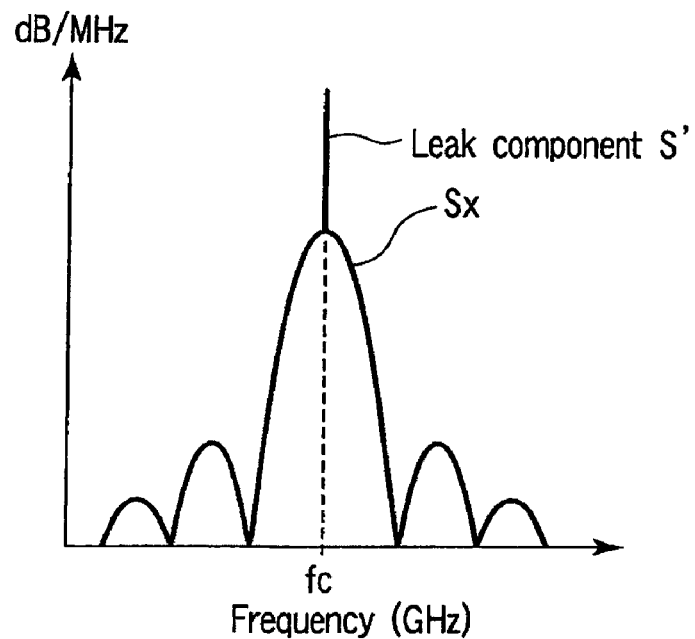
FIG. 25 is a spectrum diagram of a short pulse wave for explaining the operation of the short-range radar according to the prior art.
Figure 26:
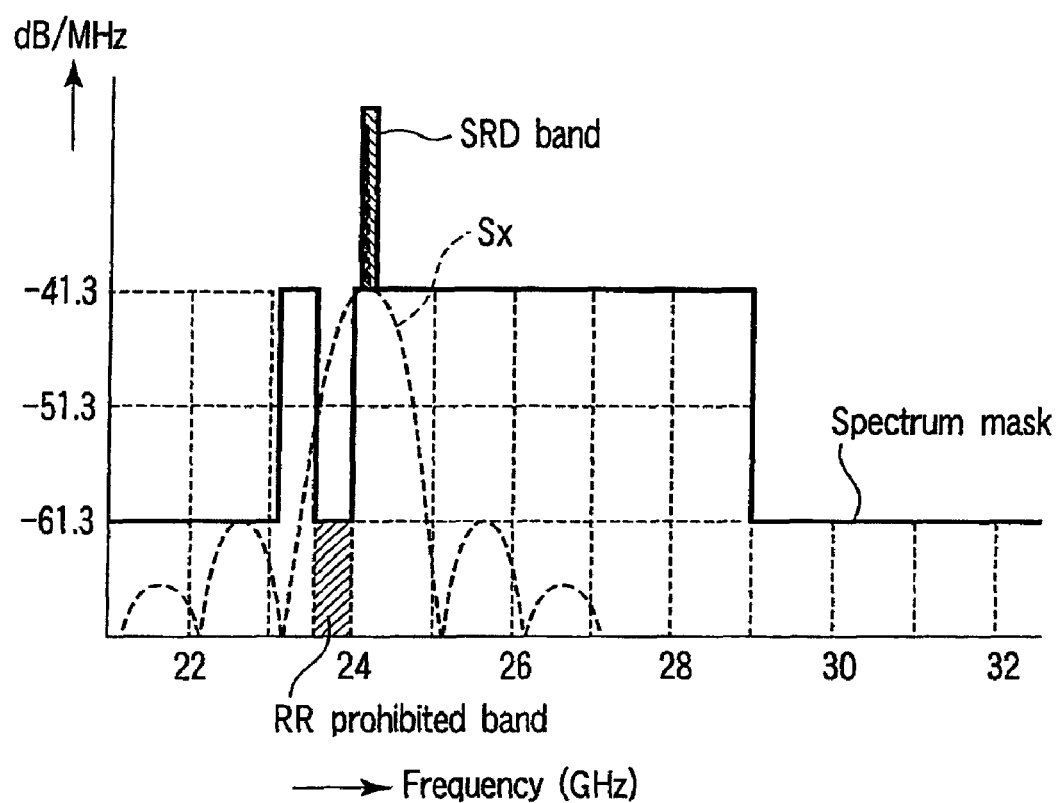
FIG. 26 is a spectrum mask diagram according to the FCC recommendation for the UWB short-range radar for explaining the operation of the short-range radar according to the prior art.

Specifically, also with the short-range radar 20 according to the fourth embodiment configured as described above, the operation similar to that shown in FIG. 2 is performed at the transmitting end as shown in (a) to (e) of FIG. 23, so that the short pulse wave Pt is emitted into the space 1, the reflected wave Pr from the object 1*a* existing in the space 1 is received, and at the timing as shown in (f) of FIG. 23, for example, the reflected signal R' is input to the quadrature demodulator 51.

The frequency of the local signal Lvco input to the quadrature demodulator 51 from the VCO 56, as shown in (g) of FIG. 23, is locked during the period when the second pulse P2 is input, and after end of this period, held by holding the control signal to the VCO 56, so that the frequency of the local signal Lvco is held in substantially stable state.

This stability holding time is assumed to be sufficiently long as compared with the width Tc of the first pulse P1 and longer than the time corresponding to the longest exploration range.

As shown in (h) of FIG. 23, therefore, in the case where the timing of inputting the pulse signal P3 to the sample-and-hold circuit 48 is superposed with the input timing of the receiving signal R', the output W (=I, Q) of the baseband corresponding to the amplitude and phase of the receiving signal R' is obtained, and as shown in (i) of FIG. 23, the holding output H (=Hi, Hq) is output to the signal processing unit 61 through the A/D converter 60 thereby to perform the process of analyzing the object 1*a*.

As described above, in the configuration for quadrature detection using the local signal with the frequency stabilized by the PLL using the burst carrier U as a reference signal, the exploration can be continuously carried out for a long time (i.e. for a long range) from the emission timing of the short pulse wave Pt.

Incidentally, although only the output period of the second pulse P2 is set as a locked period, this is not intended to limit this invention, but for any period during which the frequency of the output signal of the oscillator 25 is stable, the locked period can be set regardless of the output period of the second pulse.

In such a case, the pulse signal for specifying the locked period is generated separately from the control unit 62.

In the case where the quadrature demodulator 51 is used as the detection circuit 44 as in the short-range radar 20 shown in FIGS. 20A, B, C and 22, the local signal is required disadvantageously.

In the case where the quadrature demodulator 51 is used, however, the dynamic range thereof is twice wider in terms of the value dB than the square detection method, so that the detection is possible even for the small level of the input signal. This is effective for the short-range radar requiring a highly sensitive receiving operation.

As described above, according to the present invention, a short-range radar and a control method thereof can be provided in which the RR prohibited band and the SRD band are not interfered with while complying with the specified spectrum mask with an inexpensive configuration.

The invention claimed is:

1. A short-range radar characterized by comprising:
    a transmitting unit which emits a predetermined short pulse wave into a space from a transmission antenna;
    a receiving unit which executes a process of receiving a wave reflected from an object existing in the space; and
    a signal processing unit which executes a process of analyzing the object based on an output signal from the receiving unit,
    wherein the transmitting unit includes:
    a first pulse generating unit which outputs a first pulse having a width longer than a width of the short pulse wave in a predetermined period;
    a second pulse generating unit which outputs a second pulse having a width corresponding to the width of the short pulse wave at a timing upon lapse of a predetermined time during an output period from the time point when the first pulse generating unit starts to output the first pulse;
    an oscillator which oscillates only during the period when the first pulse generating unit outputs the first pulse and outputs a signal in a frequency band of the short pulse wave; and
    a switch which receives an output signal from the oscillator, and is turned on to pass the output signal from the oscillator only during the period when the second pulse is output by the second pulse generating unit, an output signal from the switch being emitted into the space as the predetermined short pulse wave.

2. The short-range radar according to claim 1, characterized in that a width Tc of the first pulse, a width Tp of the second pulse and isolation I of the switch are set to satisfy the following relation:

$$(Tc/Tp)^2 \leq I.$$

3. The short-range radar according to claim 1, characterized in that an oscillation frequency of the oscillator and the width Tp of the second pulse are set in such a manner that substantially a whole main lobe of the spectrum of the short pulse wave emitted into the space is included in the range of 24.0 to 29.0 GHz.

4. The short-range radar according to claim 3, characterized in that the transmission antenna has a structure surrounding an antenna element with a cavity, and a resonance frequency of the cavity is set in the band of 23.6 to 24.0 GHz thereby to reduce a gain of the particular band.

5. The short-range radar according to claim 1, characterized in that the receiving unit includes:
   a receiving antenna which receives the wave reflected from the object existing in the space;
   a detection circuit which detects a receiving signal of the reflected wave received by the receiving antenna; and
   a sample-and-hold circuit which integrates the signal detected by the detection circuit and holds the integration result, and
   the detection circuit includes:
   a diverging circuit which divides the receiving signal into a pair of signals of the same phase and outputs the pair of signals;
   a linear multiplier which linearly multiplies the pair of signals from the diverging circuit; and
   a lowpass filter which extracts a baseband component from the output signal linearly multiplied by the linear multiplier.

6. The short-range radar according to claim 5, characterized in that the linear multiplier includes:
   a first differential amplifier to which a first signal of the pair of signals is input differentially;
   second and third differential amplifiers which are connected to a load side of the first differential amplifier and to which a second signal of the pair of signals is input differentially; and
   a Gilbert mixer connected to load sides of the second and third differential amplifiers and including a monolithic microwave integrated circuit having first and second load resistors which output only a signal component equal to the product of the first signal and the second signal.

7. The short-range radar according to claim 1, characterized in that the receiving unit includes:
   a receiving antenna which receives the wave reflected from the object existing in the space;
   a detection circuit which detects a receiving signal of the reflected wave received by the receiving antenna; and
   a sample-and-hold circuit which integrates the signal detected by the detection circuit and holds the integration result, and
   the detection circuit includes:
   a quadrature demodulator which quadrature-detects the receiving signal with the output signal from the oscillator as a local signal; and
   a lowpass filter which extracts a baseband component from the output signal quadrature-detected by the quadrature demodulator.

8. The short-range radar according to claim 1, characterized in that the receiving unit includes:
   a receiving antenna which receives the wave reflected from the object existing in the space;
   a detection circuit which detects a receiving signal of the reflected wave received by the receiving antenna; and
   a sample-and-hold circuit which integrates the signal detected by the detection circuit and holds the integration result, and
   the detection circuit includes:
   a variable delay unit which delays the output signal from the oscillator;
   a quadrature demodulator which quadrature-detects the receiving signal with the output signal from the variable delay unit as a local signal; and
   a lowpass filter which extracts a baseband component from the output signal quadrature-detected by the quadrature demodulator.

9. The short-range radar according to claim 1, characterized in that the receiving unit includes:
   a receiving antenna which receives the wave reflected from the object existing in the space;
   a detection circuit which detects a receiving signal of the reflected wave received by the receiving antenna; and
   a sample-and-hold circuit which integrates the signal detected by the detection circuit and holds the integration result, and
   the detection circuit includes:
   a phase-locked loop circuit having a voltage-controlled oscillator which receives the output signal from the oscillator as a reference signal and outputs a signal synchronized in frequency with the reference signal during the period when the frequency of the reference signal is stable, and upon lapse of the period when the frequency of the reference signal is stable, holding the voltage-controlled oscillator in a state immediately before the end of the period when the frequency of the reference signal is stable;
   a quadrature demodulator which quadrature-detects the receiving signal with the output signal of the voltage-controlled oscillator of the phase-locked loop circuit as a local signal; and
   a lowpass filter which extracts a baseband component from the output signal quadrature-detected by the quadrature demodulator.

10. The short-range radar according to claim 1, characterized by further comprising an analog/digital converter which converts the output signal from the receiving unit into a digital signal and inputs the digital signal to the signal processing unit.

11. The short-range radar according to claim 1, characterized by further comprising a control unit which controls at least one of the transmitting unit and the receiving unit in accordance with a predetermined schedule or a processing result from the signal processing unit.

12. A method of controlling a short-range radar, characterized by comprising:
   a step of preparing a transmitting unit having a transmission antenna, a receiving unit and a signal processing unit;
   a step of emitting a predetermined short pulse wave into a space from the transmission antenna using the transmitting unit;

a step of executing a process of receiving a reflected wave from an object existing in the space using the receiving unit; and a step of executing a process of analyzing the object based on an output signal from the receiving unit using the signal processing unit, wherein the step of emitting the predetermined short pulse wave into the space includes:

a step of preparing a first pulse generating unit, a second pulse generating unit, an oscillator and a switch;

a step of outputting a first pulse having a width longer than a width of the short pulse wave in a predetermined period using the first pulse generating unit;

a step of outputting, using the second pulse generating unit, a second pulse having a width corresponding to the width of the short pulse wave at a timing upon lapse of a predetermined time from the time point when the first pulse generating unit starts to output the first pulse and during the period when the first pulse generating unit outputs the first pulse;

a step of causing the oscillator to be oscillated and outputting a signal in a frequency band of the short pulse wave only during the period when the first pulse generating unit outputs the first pulse;

a step of turning on the switch thereby to receive and pass the output signal from the oscillator only during the period when and the second pulse generating unit outputs the second pulse; and a step of emitting the output signal from the switch as the predetermined short pulse wave into the space.

13. The method of controlling a short-range radar according to claim 12, characterized in that a width Tc of the first pulse, a width Tp of the second pulse and isolation I of the switch are set to satisfy the following relation:

$(Tc/Tp)^2 \leq I.$

14. The method of controlling a short-range radar according to claim 12, characterized in that an oscillation frequency of the oscillator and the width Tp of the second pulse are set in such a manner that substantially a whole main lobe of the spectrum of the short pulse wave emitted into the space is included in the range of 24.0 to 29.0 GHz.

15. The method of controlling a short-range radar according to claim 14, characterized in that the transmission antenna has a structure surrounding an antenna element with a cavity, and a resonance frequency of the cavity is set in the band of 23.6 to 24.0 GHz thereby to reduce a gain of the particular band.

16. The method of controlling a short-range radar according to claim 12, characterized in that the step of executing the process of receiving the reflected wave includes:

a step of preparing a receiving antenna, a detection circuit and a sample-and-hold circuit;

a step of receiving the wave reflected from the object existing in the space using the receiving antenna;

a step of detecting the receiving signal of the reflected wave received by the receiving antenna using the detection circuit; and a step of integrating, using the sample-and-hold circuit, the signal detected by the detection circuit and holding the integration result, and the step of detecting the receiving signal includes:

a step of preparing a diverging circuit, a linear multiplier and a lowpass filter;

a step of diverging the receiving signal into a pair of signals in the same phase using the diverging circuit and outputting the pair of signals;

a step of linearly multiplying the pair of signals from the diverging circuit using the linear multiplier; and a step of extracting, using the lowpass filter, a baseband component from the output signal linearly multiplied by the linear multiplier.

17. The method of controlling a short-range radar according to claim 16, characterized in that the step of linearly multiplying the pair of signals from the diverging circuit using the linear multiplier includes:

a step of preparing a Gilbert mixer configured of a monolithic microwave integrated circuit including a first differential amplifier, second and third differential amplifiers, and first and second load resistors;

a step of differentially inputting a first signal of the pair of signals using the first differential amplifier;

a step of differentially inputting a second signal of the pair of signals using the second and third differential amplifiers connected to a load side of the first differential amplifier; and a step of outputting only a signal component equal to the product of the first signal and the second signal using the first and second load resistors connected to load sides of the second and third differential amplifiers.

18. The method of controlling a short-range radar according to claim 12, characterized in that the step of executing the process of receiving the reflected wave includes:

a step of preparing a receiving antenna, a detection circuit and a sample-and-hold circuit;

a step of receiving the wave reflected from the object existing in the space using the receiving antenna;

a step of detecting, using the detection circuit, the receiving signal of the reflected wave received by the receiving antenna; and a step of integrating, using the sample-and-hold circuit, the signal detected by the detection circuit and holding the integration result, and the step of detecting the receiving signal includes:

a step of preparing a quadrature demodulator and a lowpass filter;

a step of quadrature-detecting the receiving signal using the quadrature demodulator with the output signal from the oscillator as a local signal; and a step of extracting, using the lowpass filter, a baseband component from the output signal quadrature-detected by the quadrature demodulator.

19. The method of controlling a short-range radar according to claim 12, characterized in that the step of executing the process of receiving the reflected wave includes:

a step of preparing a receiving antenna, a detection circuit and a sample-and-hold circuit;

a step of receiving the wave reflected from the object existing in the space using the receiving antenna;

a step of detecting, using the detection circuit, the receiving signal of the reflected wave received by the receiving antenna; and a step of integrating, using the sample-and-hold circuit, the signal detected by the detection circuit and holding the integration result, and the step of detecting the receiving signal includes:

a step of preparing a variable delay unit, a quadrature demodulator and a lowpass filter;

a step of delaying the output signal from the oscillator using the variable delay unit;

a step of quadrature-detecting the receiving signal using the quadrature demodulator with the output signal from the variable delay unit as a local signal; and a step of extracting, using the lowpass filter, a baseband component from the output signal quadrature-detected by the quadrature demodulator.

20. The method of controlling a short-range radar according to claim 12, characterized in that the step of executing the process of receiving the reflected wave includes:
   a step of preparing a receiving antenna, a detection circuit and a sample-and-hold circuit;
   a step of receiving the wave reflected from the object existing in the space using the receiving antenna;
   a step of detecting, using the detection circuit, the receiving signal of the reflected wave received by the receiving antenna; and
   a step of integrating, using the sample-and-hold circuit, the signal detected by the detection circuit and holding the integration result, and
   the step of detecting the receiving signal includes:
   a step of preparing a phase-locked loop circuit including a voltage-controlled oscillator, a quadrature demodulator and a lowpass filter;
   a step of receiving, using the voltage-controlled oscillator, the output signal from the oscillator as a reference signal and outputting a signal synchronized in frequency with the reference signal during the period when the frequency of the reference signal is stable;
   a step of holding, using the phase-locked loop circuit, the voltage-controlled oscillator in a state immediately before the end of the period when the frequency of the reference signal is stable, after the lapse of the period when the frequency of the reference signal is stable;
   a step of quadrature-detecting, using the quadrature demodulator, the receiving signal of the reflected wave received by the receiving antenna with the output signal of the voltage-controlled oscillator of the phase-locked loop circuit as a local signal; and
   a step of extracting, using the lowpass filter, a baseband component from the output signal quadrature-detected by the quadrature demodulator.

21. The method of controlling a short-range radar according to claim 12, characterized by further comprising:
   a step of preparing an analog/digital converter; and
   a step of converting the output signal from the receiving unit into a digital signal using the analog/digital converter and inputting the digital signal to the signal processing unit.

22. The method of controlling a short-range radar according to claim 12, characterized by further comprising:
   a step of preparing a control unit; and
   a step of controlling at least one of the transmitting unit and the receiving unit in accordance with a predetermined schedule or a processing result from the signal processing unit using the control unit.

* * * * *